United States Patent [19]

Nakamura et al.

[11] Patent Number: 5,339,159
[45] Date of Patent: Aug. 16, 1994

[54] COLOR MISREGISTRATION DETECTOR AND COLOR MISREGISTRATION EASING SYSTEM

[75] Inventors: Kazunari Nakamura, Hino; Kenji Matsunaka, Hachioji, both of Japan

[73] Assignee: Olympus Optical Co., Ltd., Tokyo, Japan

[21] Appl. No.: 955,264

[22] Filed: Oct. 1, 1992

[30] Foreign Application Priority Data

Oct. 2, 1991 [JP] Japan .................. 3-255269
Oct. 2, 1991 [JP] Japan .................. 3-255270

[51] Int. Cl.$^5$ .............................................. H04N 7/18
[52] U.S. Cl. .............................. 348/71; 128/4; 348/263
[58] Field of Search ............... 358/98, 105, 26, 29, 358/27, 28, 36, 37, 40, 41, 42, 51, 213.24; 128/6, 4; H04N 7/18

[56] References Cited

U.S. PATENT DOCUMENTS 4,933,757  6/1990  Kanno et al. ............... 358/98
5,032,913  7/1991  Hattori et al. .

FOREIGN PATENT DOCUMENTS 0050121  2/1990  Japan ...................... 358/98
3-24513   2/1991  Japan .
3-270392 12/1991  Japan .

*Primary Examiner*—James J. Groody
*Assistant Examiner*—Michael H. Lee
*Attorney, Agent, or Firm*—Armstrong, Westerman, Hattori, McLeland & Naughton

[57] ABSTRACT

(1) A color misregistration detector comprises a matrix circuit for inputting a color image signal acquired on a time-series basis and generating color difference signals R-Y and B-Y, differentiating circuits for differentiating the color difference signals and detecting the quantities of changes in the color difference signals, comparators for detecting quantities of changes exceeding set values among said quantities of changes in the color differences, a counter circuit for counting the number of points indicating large changes in color differences these comparators compare and detect, and a CPU for monitoring a time-series change in the count and identifies presence of color misregistration.

(2) A color misregistration easing system includes a correcting means for synthesizing a raw color image signal and a color image signal of a last image without color misregistration or selecting either of the signals according to the result of the identification the CPU provides.

48 Claims, 31 Drawing Sheets

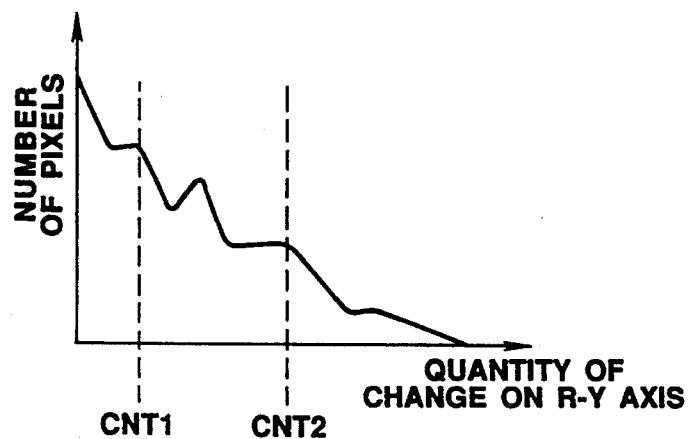
FIG. 3(a)
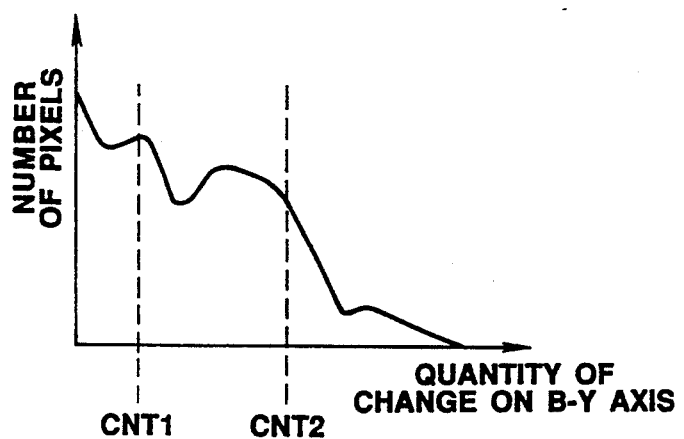
FIG. 3(b)
FIG. 4
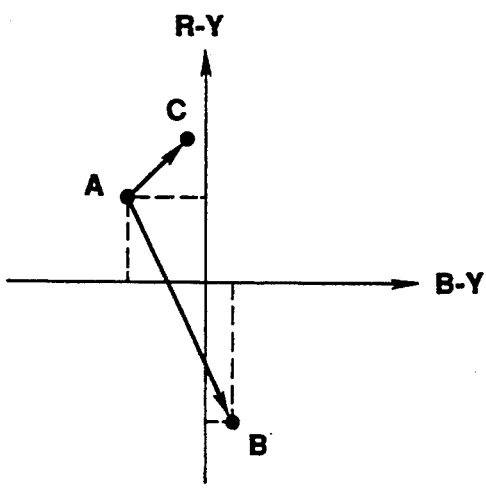

WATER SUPPLY TUBE

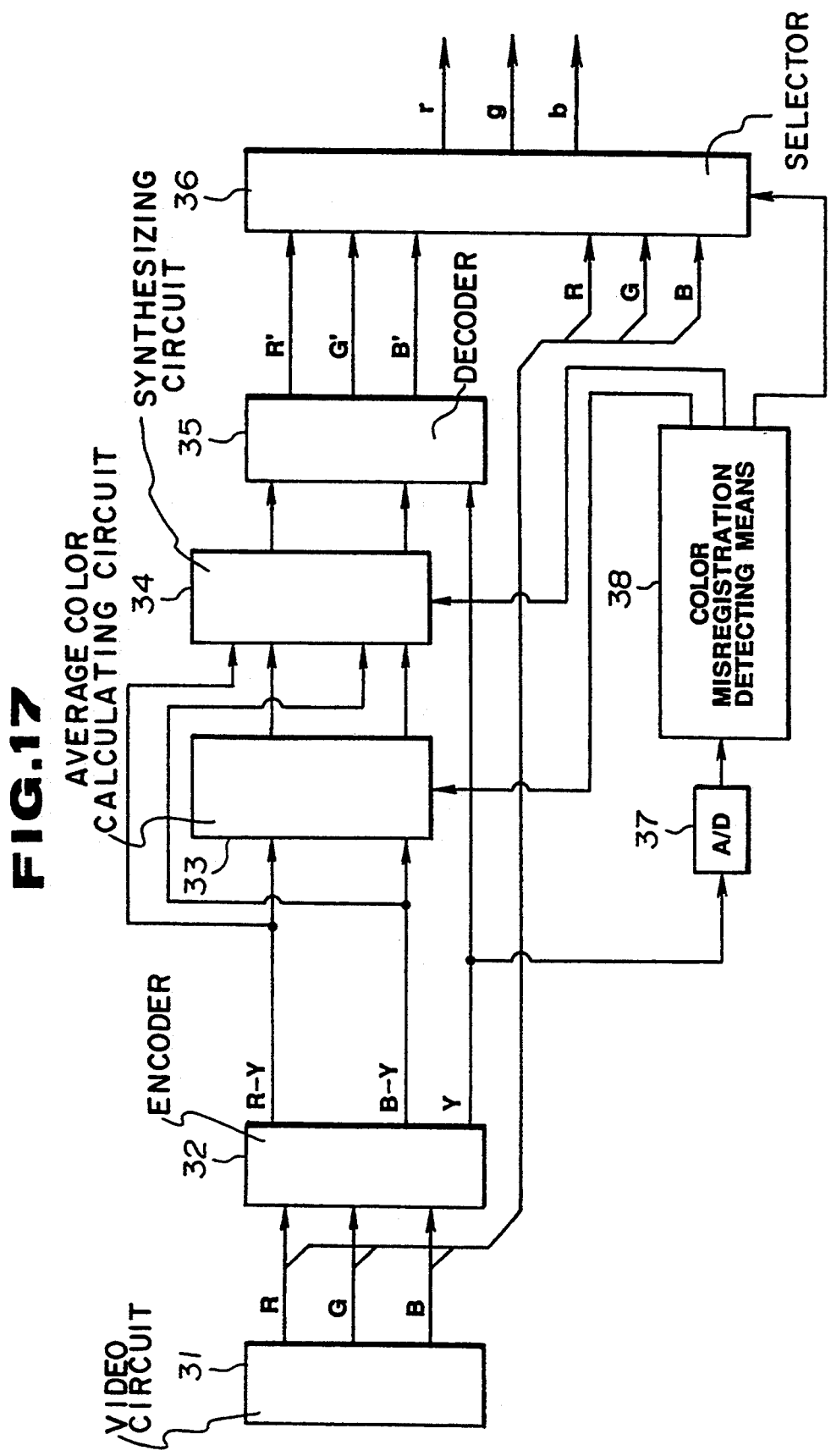

LUMINANCE HISTOGRAM
DURING NORMAL OPERATION

LUMINANCE HISTOGRAM
DURING WATER SUPPLY

FIG. 23(a)
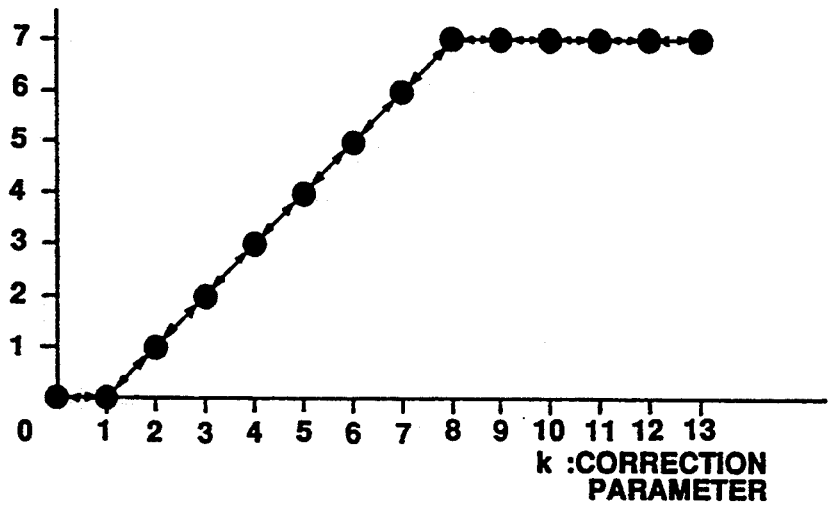
SINGLE-TRACE METHOD
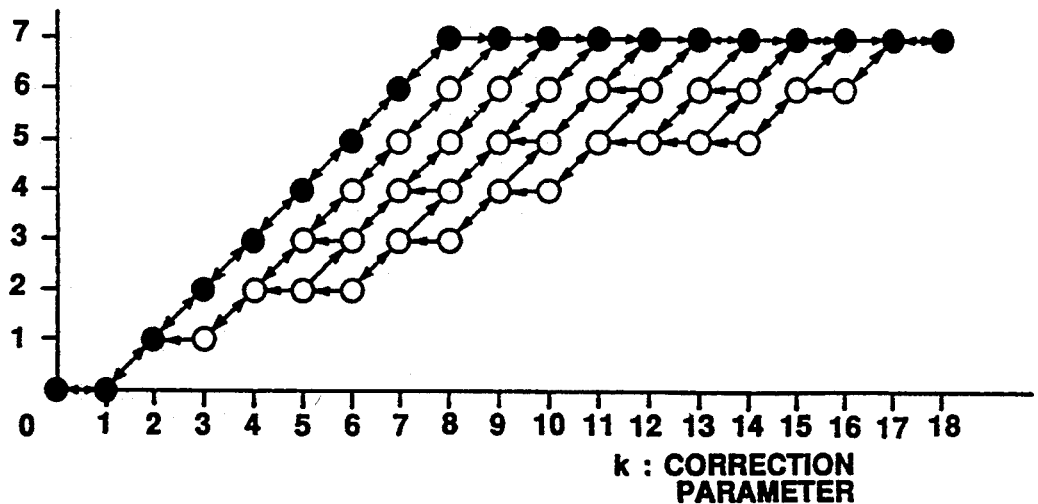
MULTI-TRACE METHOD
FIG. 23(b)

SPATIAL DISTRIBUTION
OF COLOR DIFFERENCE
DURING WATER SUPPLY

SPATIAL DISTRIBUTION
OF COLOR DIFFERENCE
DURING NORMAL OPERATION

SPATIAL DISTRIBUTION
OF COLOR DIFFERENCE
DURING DYEING

RELATIONSHIP AMONG SPATIAL DISTRIBUTIONS OF COLOR DIFFERENCE IN MODES

NONSTANDARD COLOR 1

NONSTANDARD COLOR 2

NONSTANDARD COLOR 3

NONSTANDARD COLOR 4

COMPOSITION OF NONSTANDARD COLORS

FIG.33

| SUBJECT COLOR DIFFERENCE SPACE \ MODE | WATER SUPPLY | WATER SUPPLY | BLOOD COLOR DYEING | BLOOD COLOR DYEING | BLOOD COLOR NORMAL | BLOOD COLOR NORMAL |
|---|---|---|---|---|---|---|
| ⟨R⟩ | ○ | — | ○ | — | ○ | — |
| ⟨B⟩ | ○ | — | — | ○ | — | — |
| ⟨G⟩ | — | ○ | — | — | — | — |
| PROCESSED COLOR (NONSTANDARD COLOR) | A STATE BEFORE WATER SUPPLY IS MAINTAINED. | | 4 | 3 | 2 | 1 |

COLOR MISREGISTRATION DETECTOR AND COLOR MISREGISTRATION EASING SYSTEM

BACKGROUND OF THE INVENTION

1. Field of the Invention

The present invention relates to a color misregistration detector for detecting color misregistration derived from field sequential imaging and a color misregistration easing system for detecting color misregistration and easing color misregistration.

2. Description of the Related Art

An endoscope whose elongated insertion tube is inserted into a living body to observe a lesion or other subject has been widely adopted in recent years.

An electronic endoscope system employing a CCD or other solid state imaging device as an imaging means has come into practical use.

The electronic endoscope includes a field-sequential type electronic endoscope. Herein, a subject is illuminated with illumination light of red, green, and blue rays having different wavelengths, and imaged under the illumination light. Then, produced images or component images are synthesized to form a single color image.

In this method, component images produced at different times are synthesized to form a single color image. When a moving subject is imaged or an imaging means and a are moving relatively, a synthetic color image usually has colors different from original colors of the subject.

During endoscopic examination, a mucosa may adhere to an objective at the tip of an endoscope. This hinders accurate observation of images. In this case, water supply is performed; water is injected from the distal end of the endoscope toward the objective in order to clean the lens. During water supply, water runs fiercely in front of the objective. When the water is illuminated with field sequential illumination light, the water image is produced with greatly-changed colors or is rainbow-colored. Some endoscopes supply water to wash and cool a subject lesion. FIG. 1 shows the process of color misregistration.

The principles of causing such a color reproduction error will be described in conjunction with FIG. 1. When water is supplied from the distal end of an endoscope, water runs quickly in front of an objective. Then, with red (R) illumination light, for example, the water appears as red water (object) just coming out of the distal end of the endoscope. With green (G) light, a waterdrop moving on the lens surface is visualized as a green object. With blue (B) light, a blue water image is seen having moved farther. On the monitor, a synthetic image of these color images is displayed.

Therefore, a water image is displayed as a primary image of red, green, blue, yellow, cyan, and magenta with a high saturation. That is to say, the water image is rainbow-colored, causing a doctor to suffer fatigued eyes. This drawback or a color reproduction error attributable to different sampling times of color information is referred to as color misregistration.

In an effort to overcome the drawback, the present applicant has proposed a related art in Japanese Patent Application No. 2-70644. Herein, color component checked to identify color misregistration. Then, when color misregistration is identified, false color signals are supplied together with a real luminance to ease the color misregistration.

In Japanese Patent Application No. 2-27842 No. 5,032,913), the applicant has proposed installation water supply detecting means that uses an image signal from an electronic endoscope to identify color misregistration due to water supply. Only when color misregistration due to water supply is identified, a false color is output. Thus, only intense color misregistration is eased. In other words, this system detects color misregistration, then replaces the data of color misregistration with average R, G, and B values or correction values.

Japanese Patent Laid-Open No. 3-24513 has color misregistration detector for a field-sequential misregistration easing system. Herein, a current image is used to generate color difference signals, then the hue is calculated. After that, the hue component is held.

A region with water supplied or other region causing conspicuous color misregistration has a high saturation. In a general image, bleeding appears with a relatively high saturation.

In such a color misregistration detecting method, only a hue component is used to detect color misregistration. Color misregistration is detected irrelative to the degree. Even negligible color misregistration an observer will not discern is corrected. Color misregistration is detected at a degree inconsistent with a level at which a sensory test has revealed that an observer discerns color misregistration. Even indiscernible color misregistration is corrected, deteriorating the quality of observation images.

When color misregistration is detected, color misregistration correction has been applied to an entire screen. However, during, for example, water supply or suction, significant color misregistration occurs in part of a screen and a quantity of a change in hue exceeds a certain value in that part, while color misregistration in the other part is often indiscernible. That is to say, since color misregistration correction is performed all over a uniformly, correction is applied to portions that need not be corrected. As a result, the corrected image appears unnatural.

OBJECTS AND SUMMARY OF THE INVENTION

An object of the present invention is to provide a color misregistration detector capable of detecting color misregistration in a portion of a screen to which color misregistration correction must be applied.

Other object of the present invention is to provide a color misregistration detector capable of detecting occurrence of intense color misregistration due to water supply.

Other object of the present invention is to provide a color misregistration detector capable of distinguishing an image with color misregistration from a normal image or other image without color misregistration so that when water supply is in progress or color misregistration correction is needed, color misregistration correction will not be applied to an image portion which does not require color misregistration correction.

Other object of the present invention is to provide a color misregistration detector capable of detecting color misregistration on a pixel or given block basis.

Other object of the present invention is to provide a color misregistration detector capable of detecting misregistration whose intensity exceeds an observer's discernible level of color misregistration.

Other object of the present invention is to provide a color misregistration detector capable of detecting color misregistration in color image information easily so that color misregistration correction can be performed optimally.

Other object of the present invention is to provide a color misregistration easing system capable of detecting color misregistration whose intensity exceeds an observer's discernable level of color misregistration and preventing deterioration of image quality.

Other object of the present invention is to provide a color misregistration easing system capable of detecting water supply, performing color misregistration correction, and preventing deterioration of image quality.

Other object of the present invention is to provide a color misregistration easing system capable of detecting a cause of color misregistration and controlling color misregistration correction according to the result of the detection.

A preferred embodiment of the present invention is a color misregistration detector for detecting color misregistration in a color image signal of a subject imaged using a field sequential type imaging means. The color misregistration detector comprises a color information detecting means for detecting at least a value of color information contained in the color image signal, a color information comparing means for comparing color information detected by the color information detecting means with given color information, and a determining means for determining a cause of color misregistration according to the result of the comparison provided by the color information comparing means.

Other preferred embodiment of the present invention is a color misregistration easing system having the color misregistration detector, including a correcting means for correcting the color image signal according to the result of the determination provided by the determining means.

The other features and advantages of the present invention will be apparent from the description below.

BRIEF DESCRIPTION OF THE DRAWINGS

FIGS. 3(a) and 3(b) are graphs showing the relationships between the quantities of changes on the R-Y and B-Y axes of a color difference plane and the count of the number of pixels;

FIG. 4 is an explanatory diagram showing a change in color misregistration on a color difference plane;

FIG. 17 shows a configuration of a color misregistration detector of the seventh embodiment;

FIGS. 23a and 23b are luminance histograms each showing the relationship between the correction parameter and correction level, and state transition;

FIG. 33 is a table listing criteria for detecting color misregistration pixels during mode detecting;

DETAILED DESCRIPTION OF THE PREFERRED EMBODIMENTS

Figure 1:
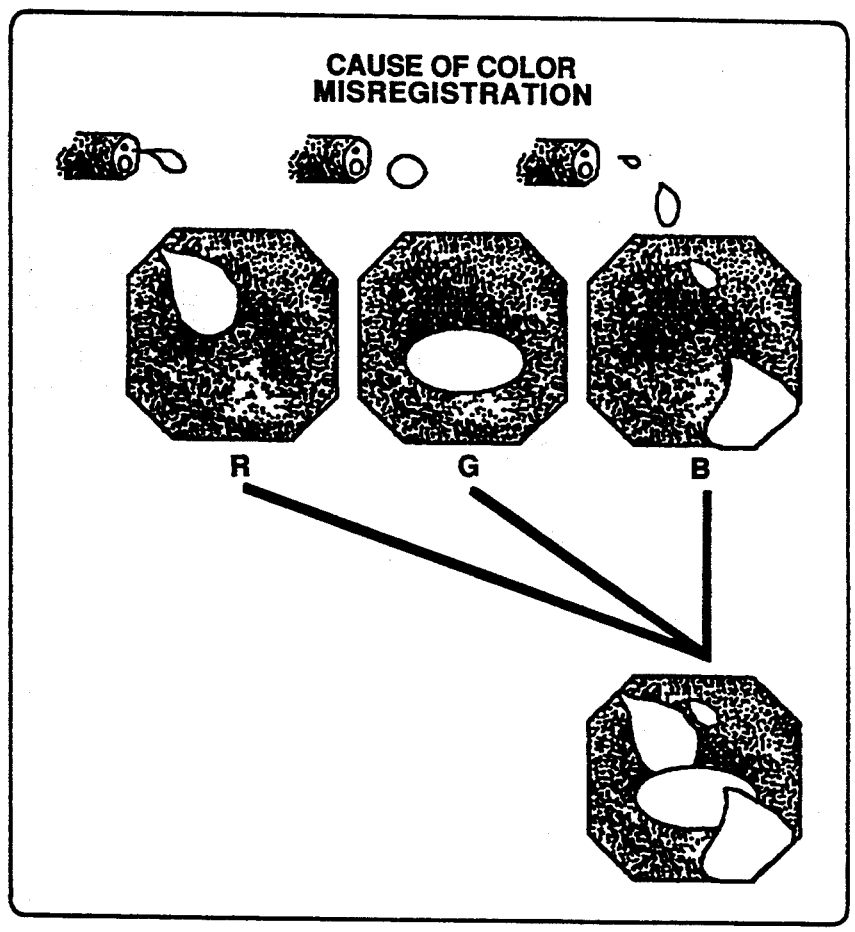
FIG. 1 is an explanatory diagram showing a cause of color misregistration.
Figure 2:
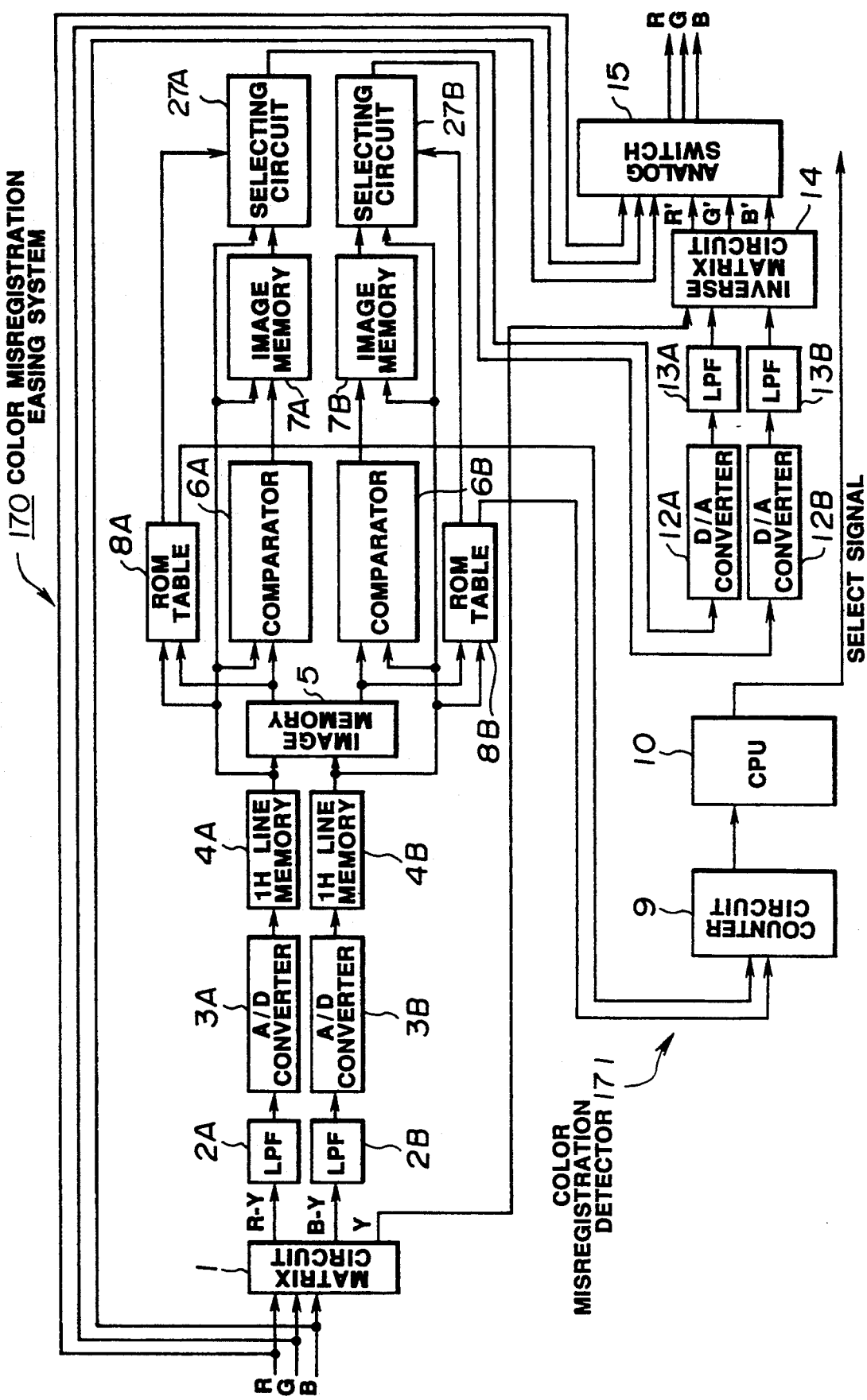
FIG. 2 is an overall block diagram of a color misregistration easing system including a color misregistration detector of the first embodiment.

FIGS. 2 to 4 relate to the first embodiment of the present invention. FIG. 2 is an overall block diagram of a color misregistration easing system including a color misregistration detector of the first embodiment. FIG. 3 are graphs each showing the relationship between the quantity of a change on the R-Y or B-Y axis in a color difference plane and the count of the numbers of pixels.

FIG. 4 is an explanatory diagram showing a change in color misregistration on a color difference plane.

First, an overall configuration of an electronic endoscope system will be described with reference to FIG. 35.

In an electronic endoscope 161 for observing a mucosal image of a living body in a body cavity, a light guide 162 routes illumination light from a light source 163 into the body cavity. Thus, the inside of the living body is illuminated. A camera control unit 166 controls the light source 163 to switch illumination light of red (R), green (G), and blue (B) rays in field cycles (in units of 1/60 sec). Under the control of the camera control unit 166, a solid state imaging device 164 receives reflected light from a subject in fields sequentially via a zoom lens 165, transforms the light photoelectrically, then outputs an image signal of the subject to the cameral control unit 166. That is to say, the imaging device 164 receives R, G, and B frame images in field cycles (1/60 second).

The zoom lens 165 enlarges an image the solid state imaging device 164 acquires. When an operation lever formed on a scope operation unit 167, which is not shown, is manipulated, the optical system of the zoom lens 165 moves to change angles of view.

The camera control unit 166 performs given signal processing on an image signal of subject, then outputs R, G, and B image signals that are interlaced. To be more specific, R, G, and B frame image signals sent from the imaging device 164 are stored in R, G, and B frame memories that are not shown, read out in fields, interlaced, then supplied to a color misregistration easing system 170.

An image signal the camera control unit 166 handles is of the field sequential type. Therefore, when either a subject or a scope starts moving at an earlier time, color misregistration occurs. When the angle of view of the zoom lens 165 is changed abruptly by manipulating the scope operation unit 167, color misregistration occurs. The image signal the camera control unit 166 has handled is sent to the color misregistration easing system 170 for color misregistration correction. The image signal whose color misregistration is corrected by the color misregistration easing system 170 is supplied to a TV monitor 169, and thus a subject image is displayed.

In FIG. 2, a color misregistration easing system 170 is provided with R, G, and B image signals sent from a camera control unit 166. The color misregistration easing system 170 includes a color misregistration detector 171 for detecting color misregistration in input R, G, and B image signals. The color misregistration easing system 170 corrects three primary color input signals R, G, and B for color misregistration, and selectively outputs either three primary color correction signals R', G', and B' resulting from color misregistration correction or three primary color input signals R, G, and B according to the state of color misregistration. Since field-sequential imaging is adopted, R, G, and B signals entering an encoder 1 in the color misregistration easing system 170 are updated sequentially in cycles of 1/60 sec by component image signals placed in frame memories in fields.

As shown in FIG. 2, input R, G, and B signals making up a color image signal are supplied to a matrix circuit 1 serving as a color information detecting means and to an analog switch 15. The analog switch 15 inputs three primary color correction signals R', G', and B' sent from an inverse matrix circuit 14 to be described later. The analog switch 15 receives a select signal from a CPU 10. With the select signal, either a combined signal of three primary color signals R, G, and B or a combined signal of three primary color correction signals R', G', and B' is selected and supplied to a display that is not shown.

The matrix circuit 14 decomposes three input primary color signals R, G, and B into a luminance signal Y and color signals. In this embodiment, color difference signals R-Y and B-Y are generated as the color signals. The luminance signal Y and color difference signals R-Y and B-Y enter the inverse matrix circuit 14 and low-pass filters (hereafter, LPF) 2A and 2B. The LPFs 2A and 2B restricts the frequencies of the color difference signals R-Y and B-Y the matrix circuit 1 provides to a low band, then outputs the restricted color difference signals to A/D converters 3A and 3B. The A/D converters 3A and 3B convert the outputs of the LPFs 2A and 2B into digital color difference signals, and outputs the digital signals to 1 H line memories 4A and 4B. In the line memories 4A and 4B, input data are delayed for a maximum of 1 H (one horizontal) period. In the line memories 4A and 4B, the outputs of the A/D converters 3A and 3B are delayed for a period of time of less than the 1 H period that includes a signal delay time of several clocks arising in a correction signal processing system from the matrix circuit 1 to the analog switch 15. Thereby, three primary color correction signals R', G', and B' entering the analog switch 15 lag behind the three primary color input signals R, G, and B by the 1 H period. In other words, the three primary color correction signals R', G', and B' lag behind the three primary color input signals R, G, and B by one vertical line on a screen. However, no time lag arises horizontally. Owing to vertical correlation of image data, the vertical time lag resulting from color misregistration correction is indiscernible.

Color difference data R-Y read from the 1 H line memory 4A is supplied to an image memory 5, an image memory 7A for storing a last image or pixels not causing color misregistration, a comparator 6A, a ROM table 8A, and a selecting circuit 27A. Color difference data B-Y read from the 1 H line memory 4B is supplied to the image memory 5, a image memory for a last image 7B, a comparator 6B, a ROM table 8B, and a selection circuit 27B.

The image memory 5 is a first-in-first-out (hereafter, FIFO) memory for detecting color misregistration, in which input color difference data R-Y and B-Y are delayed for a four-field period, and supplied to the comparators 6A and 6B, and the ROM tables 8A and 8B. As described above, the R, G, and B signals sent from an endoscope are updated, for example, in that order in field cycles. Therefore, it takes a three-field period for all R, G, and B component images to change. This means that color misregistration can be detected by comparing between image data of a four-field or longer period before and after. Scanning lines in an odd field and an even field are mismatched. However, in the image memory 5, color difference data is delayed for a four-field period to compare data of the same pixels.

The ROM table 8A contains a difference between color difference data R-Y of a four-field period before and after (quantity of a change of the R-Y axial in a color difference plane) at an address specified with the color difference data R-Y of a four-field period before and after that are an input and an output of the image memory 5. The ROM table 8B contains a difference between color difference data B-Y of a four-field period before and after (quantity of a change on the B-Y axis in a color difference plane) at an address specified with the color difference data of a four-field period before and after. When an address in the ROM table 8A or 8B is specified with an input and an output of the image memory 5, data of a quantity of a change is retrieved from the specified address and supplied to the selecting circuit 27A or 27B, and to a counter circuit 9.

A comparator 6A compares between color difference data R-Y of a four-field period before and after that are an input and an output of the image memory 5. If the color difference data R-Y are consistent, a consistency detected signal is sent to an image memory 7A. Similarly, a comparator 6B compares between color difference data B-Y of a four-field period before and after that are an input and an output of an image memory 5. If the color difference data B-Y are consistent, a consistency detected signal is sent to an image memory 7B. That is to say, the comparators 6A and 6B determine for each pixel whether color difference components have changed from a four-field period before to the four-field period after.

Each of the image memories 7A and 7B has addresses associated with pixels of a screen and contains color difference data R-Y or B-Y for one frame. When consistency detected signals from the comparators 6A and 6B indicate that no color misregistration has occurred, color difference data R-Y and B-Y read from 1 H line memories 4A and 4B are held in the image memories 7A and 7B. More particularly, in the image memories 7A and 7B, data associated with pixels are updated by color difference data R-Y and B-Y of a pixel in which no color misregistration has occurred, then a last image acquired before occurrence of color misregistration is stored on a pixel basis. Unless color misregistration is developed forcibly and consecutively, even when update is done to the greatest extent, new color difference data are written in the image memories 7A and 7B within one second after the previous update.

Data read from the image memories 7A and 7B are supplied to selecting circuits 27A and 27B. The selecting circuits 27A and 27B are provided with data of quantities of changes in color difference data read from ROM tables 8A and 8B. When the quantities of changes are smaller than given values, the selecting circuits 27A and 27B determine that no color misregistration has occurred in a given pixel, then output the color difference data R-Y and B-Y of the pixel read from line memories 4A and 4B as they are. When the quantities of changes are larger than the given values, the selecting circuits 27A and 27B determine that color misregistration has occurred in the given pixel, then supply color difference data R-Y and B-Y of the pixel of the immediately preceding field, which are read from the image memories 7A and 7B, to D/A converters 12A and 12B, but do not supply the color difference data R-Y and B-Y of the pixel read from the line memories 4A and 4B.

The D/A converters 12A and 12B convert input color difference data R-Y and B-Y into analog color difference signals (R-Y)' and (B-Y)', then supply the signals (R-Y)' and (B-Y)' to LPFs 13a and 13B. The LPFs 13A and 13B restrict frequencies of input color difference signals to a low band, then supply the restricted signals to an inverse matrix circuit 14. Thus, the inverse matrix circuit 14 receives corrected color difference signals representing part of a screen having intense color misregistration and uncorrected color difference signals representing part of the screen having little color misregistration. The inverse matrix circuit 14 performs inverse matrix processing on a luminance signal Y and color difference signals (R-Y)' and (B-Y)' to generate three primary color correction signals R', G', and B', then outputs the signals R', G', and B' to an analog switch 15.

On the other hand, data of quantities of changes retrieved from ROM tables 8A and 8B are also supplied to a counter 9 on a pixel basis. The counter 9 counts pixels for each quantity of a change and calculates the number of pixels having the same quantity of a change. As described previously, a quantity of a change represents a difference between color difference data of a four-field period before and after. The counter 9 provides a distribution of transition of a difference between color difference data of screens. The count output of the counter 9 is put in a CPU 10.

Based on the output of the counter 9, the CPU 10 determines whether color misregistration of a given screen exceeds an observer's discernible level of color misregistration, then provides the analog switch 15 with a select signal for selecting either three primary color correction signals R', G', and B' resulting from color misregistration correction or three primary color input signals R, G, and B according to the result of the determination. Transition of a difference between color difference data is unique to each image. Therefore, the CPU 10 monitors a time-series change in the output of the counter 9 to detect an image causing outstanding color misregistration due to, for example, water supply or suction, then controls color misregistration correction. The analog switch 15 selects either the combined signal of three primary color correction signals R', G', and B' or the combined signal of three primary color input signals R, G, and B, then outputs the selected combined signal.

The color misregistration detector 171 is made up of a matrix circuit 1, an image memory 5, and ROM tables 8A and 8B which serve as a color information change detecting means, a counter circuit 9 serving as a change value distribution calculating means, and a CPU 10 serving as a determining means.

Next, the operations of the embodiment having the aforesaid configuration will be described.

An endoscope that is not shown is inserted into a living body to observe, for example, the gastric wall. During observation, water is supplied and the region is dyed. R, G, and B signals from the endoscope are interlaced, and supplied to a matrix circuit 1 and to an analog switch 15. The matrix circuit 1 produces color difference signals R-Y and B-Y. These color difference signals are supplied to A/D converters 3A and 3B via LPFs 2A and 2B, then converted into digital signals. The digital color difference data R-Y and B-Y are placed in 1 H line memories 4A and 4B, and delayed by a delay time arising in the color misregistration correction system. Then, the color difference data R-Y and B-Y are put in an image memory 5. In the image memory 5, the color difference data R-Y and B-Y delayed by a four-field period. Then, the delayed color difference data is read out.

Each of comparators 6A and 6B compares between color difference data R-Y and B-Y of a four-field period before and after on a pixel basis. If the color difference data are consistent, each of the comparators 6A and 6B outputs a consistency detected signal. In response to inputs of consistency detection signals, the color difference data R-Y and B-Y read from 1 H line memories 4A and 4B are written at addresses associated with the pixel position in image memories 7A and 7B.

On the other hand, differences (quantities of changes) between color difference data R-Y and B-Y of a four-field period before and after are fetched from ROM tables 8A and 8B, then supplied to selecting circuits 27A and 27B. When data of quantities of changes read from the ROM table 8A and 8B indicate that the color difference data R-Y and B-Y read from the 1 H line memories 4A and 4B have changed by given values or more from those of the same pixel of four fields before, the selecting circuits 27A and 27B read color difference data R-Y and B-Y from the addresses associated with the pixel position in the image memories 7A and 7B, then supply the read data. In short, the selecting circuits 27A and 27B switch color difference data of a pixel causing color misregistration into color difference data of the pixel in a last image acquired before occurrence of the color misregistration, then supply the color difference data of the pixel in the last image. This switching is done on a pixel basis.

The outputs of the selecting circuits 27A and 27B are recomposed to analog signals by D/A converters 12A and 12B, restricted to a certain frequency band by LPFs 13a and 13B, then supplied to an inverse matrix circuit 14. The inverse matrix circuit 14 receives a luminance signal Y from the matrix circuit 1 and color difference signals (R-Y)' and (B-Y)' from the LPFs 13A and 13B, produces three primary color correction signals R', G', and B', then outputs the R', G', and B' to analog switch 15.

In this embodiment, the luminance signal Y is not corrected. In other words, a luminance signal is acquired from a raw image but not from a still image produces before occurrence of color misregistration. This permits reliable reproduction of motion of an image.

On the other hand, quantities of changes in color difference data R-Y and B-Y of a four-field period before and after are also read from the ROM tables 8A and 8B, then supplied to a counter circuit 9 sequentially. Assuming that intense color misregistration occurs because of water supply or suction, the chromaticity of a given pixel changes remarkably from four fields before to four fields after or from a point A to a point B in FIG. 4. The quantities of changes in color difference data are large. In a normal image in which color misregistration is hardly discernible, the chromaticity changes slightly or from a point A to a point C in FIG. 4. The quantities of changes in color difference data are very small.

The counter circuit 9 counts pixels for each quantity of a change and provides the number of pixel having the same quantity of a change. When the number of pixels each having a large quantity of a change in a screen exceeds a given value, a CPU 10 determines that water supply is in progress. Then, the CPU 10 outputs a select signal for selecting an output of an inverse matrix circuit 14 to an analog switch 15. Thus, only when intense color misregistration occurs due to water supply, the CPU 10 permits color misregistration correction. When color misregistration is indiscernible, a raw signal is supplied.

For color misregistration correction to be controlled more consistently with an observers' discernible level, the CPU 10 may monitor a time-series change in a count output and determine whether or not to permit color misregistration correction. FIG. 3 provide graphs for explaining the references the CPU 10 uses to make determinations. That is to say, the CPU 10 monitors on a time-series basis a count output representing the number of pixels having a relatively small quantity of a change (CNT1) and a count output representing the number of pixels having a relatively large quantity of a change (CNT2).

Normally, when a mucosal image is animated, changes in color difference signals are relatively small. When gastric juice is sucked, an imaging unit of an endoscope is sunk in water to suck gastric juice. Even in this case, changes in color difference signals are relatively small. Therefore, using only a count at the CNT1 level, an animated mucosal image having conspicuous color misregistration cannot be differentiated from an image produced during suction. However, suction continues for one to two seconds. That is to say, counting continues over several tens of frames. Consequently, the count at the CNT1 level comes to a large value. For this reason, when a count at the CNT1 level exceeds a given value for a relatively short period, the CPU 10 identifies an animated mucosal image and outputs a select signal for selecting input signals R, G, and B. When the count at the CNT1 level exceeds the given value several tens of times continuously, the CPU 10 becomes aware that suction is under way, and outputs a select signal for selecting three primary correction color signals R', G', and B'.

On the other hand, during water supply or suction in which a scope is not sunk in water, changes in a color difference signals are large. Therefore, in this case, a count at the CNT2 level becomes a large value. For instance, when a halation area of a mucosal image moves, the count at the CNT2 level becomes large. For correcting this kind of halation area, the CPU 10 instructs that when a count exceeds a given value, three primary color correction signals R', G', and B' should be selected without taking account of a time-series change in a count at the CNT2 level. On the other hand, when the image need not undergo color misregistration correction, the CPU 10 does not carry out correction until the count at the CNT2 level exceeds the given value for a given period.

Thus, in this embodiment, a counter circuit 9 counts the number of pixels for each quantity of a change in color difference data. A CPU 10 monitors the counts and recognizes a distribution of color misregistration in a screen. Thereby, the CPU 10 identifies a cause of the color misregistration. Only for color misregistration derived from water supply or color misregistration discernible to an observer, color misregistration correction is carried out. This prevents deterioration of image quality due to unnecessary correction.

In addition, since time-series changes in quantities of changes in color difference data are detected, conspicuous color misregistration can be distinguished from inconspicuous color misregistration more precisely. This permits high-precision image display. Comparators 6A and 6B put color difference data of a last image acquired before occurrence of color misregistration into image memories 7A and 7B on a pixel basis. When color misregistration occurs, selecting circuits 27A and 27B read data from the image memories 7A and 7B, and supply the data. Therefore, color misregistration correction can be done on a pixel basis. This results in improved quality of an image that has undergone color misregistration correction.

When the comparators and selecting circuits handle data on a block basis, color misregistration correction can be done, needless to say, on a block basis.

During water supply, color misregistration occurs all over a screen. Comparison between image signals of a four-field period before and after does not permit detection of color misregistration. When intense color misregistration occurs because of water supply, writing in the image memories 7A and 7B for recording only still images may be stopped.

Figure 5:
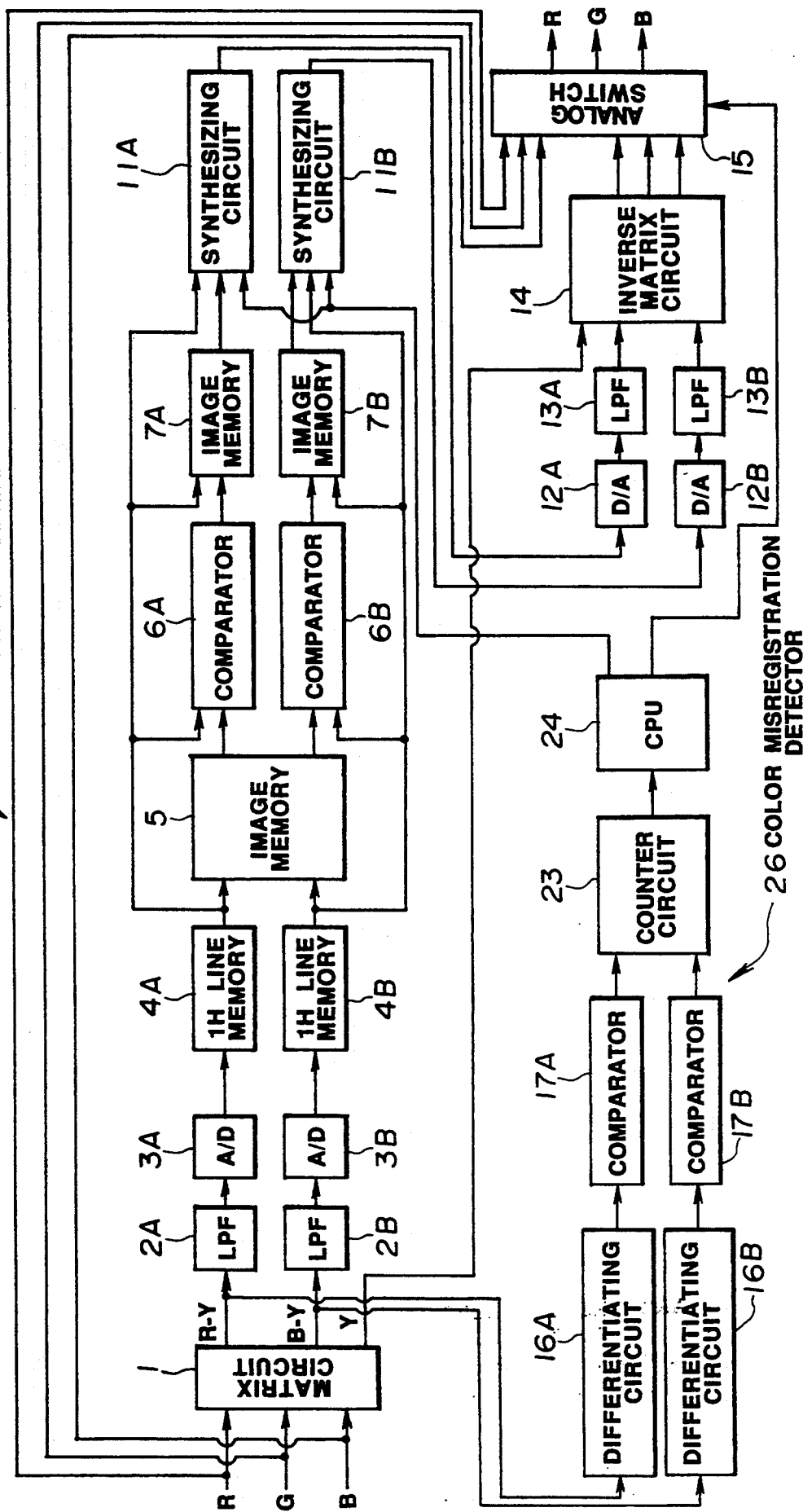
FIG. 5 is an overall block diagram of a color misregistration easing system including a color misregistration detector of the second embodiment.
Figure 6:
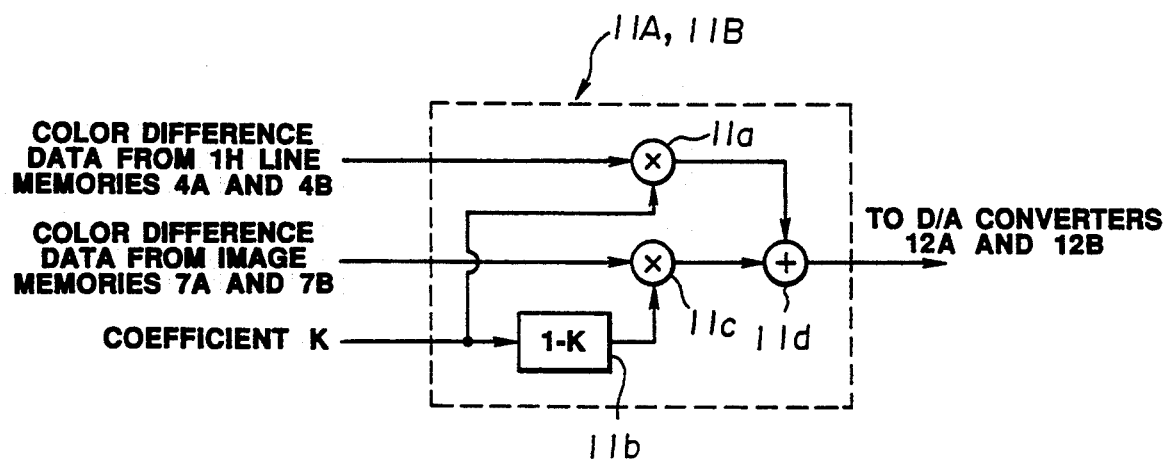
FIG. 6 is a block diagram of a synthesizing circuit.
Figure 7:
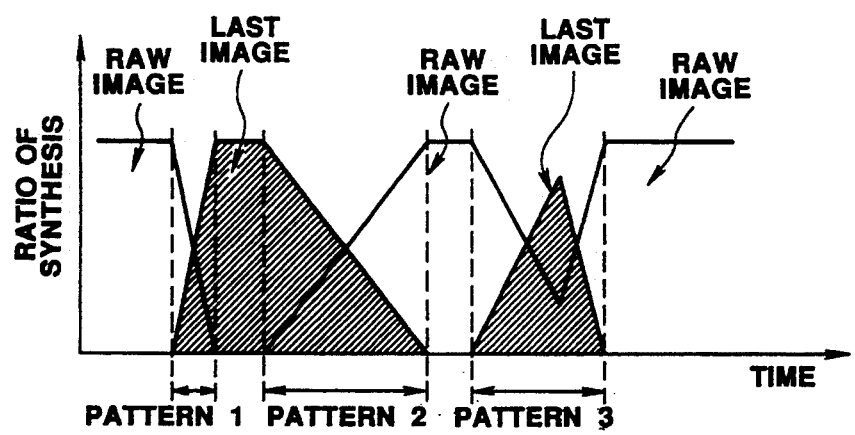
FIG. 7 is an explanatory diagram showing an example of synthetic ratios between a raw image and a correction image.
Figure 8:
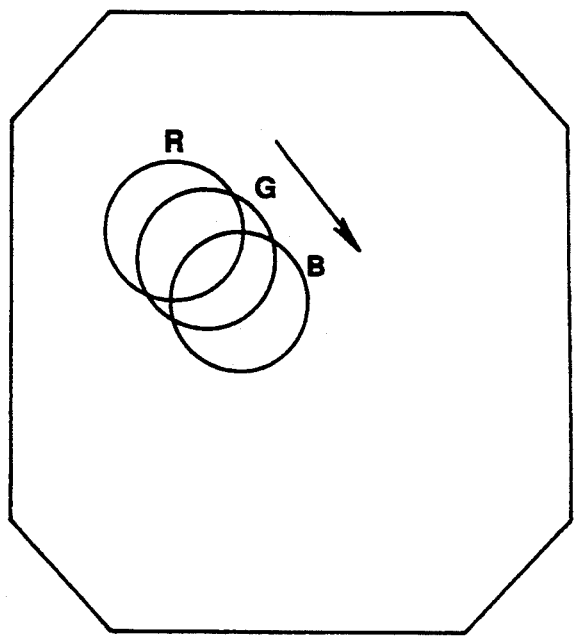
FIG. 8 is an explanatory diagram showing an example of a normal image.
Figure 9:
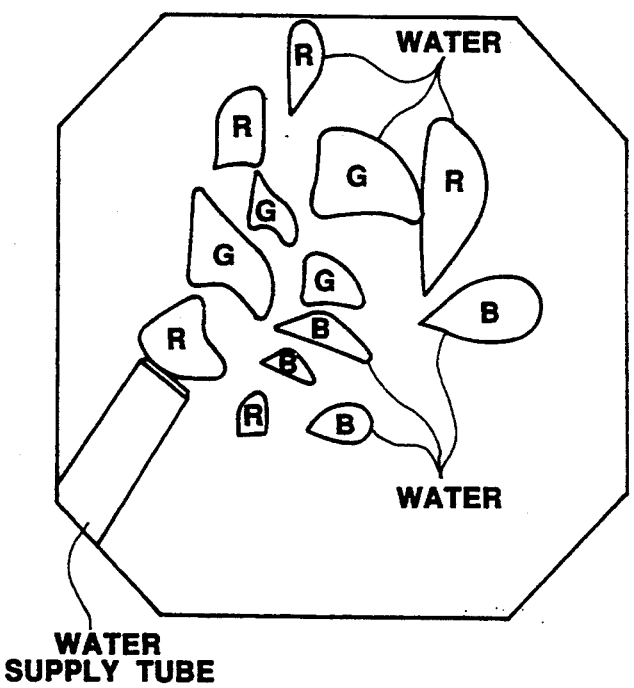
FIG. 9 is an explanatory diagram showing an example of an image produced during water supply.
Figure 10:
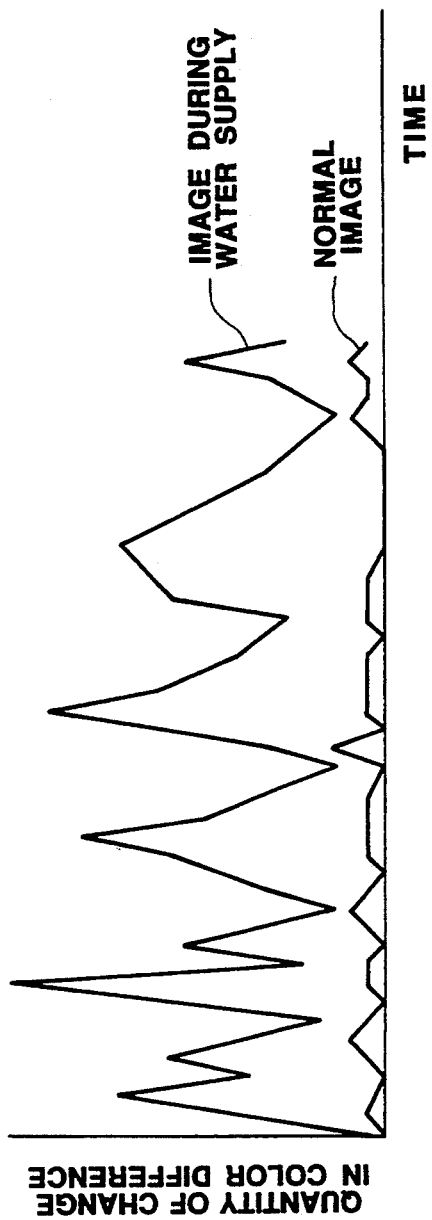
FIG. 10 is a graph showing a time-sequential change in the number of points at which color differences change.

FIGS. 5 to 10 relate to the second embodiment of the present invention. FIG. 5 is an overall block diagram of a color misregistration easing system including a color misregistration detector. FIG. 6 is a block diagram of a synthesizing circuit. FIG. 7 is an explanatory diagram showing an example of synthetic ratios between a raw image and a correction image. FIG. 8 is an explanatory diagram showing an example of a normal image. FIG. 9 is an explanatory diagram showing an example of an image produced during water supply. FIG. 10 is a graph showing a time-sequential change in the number of points at which color differences change.

Figure 35:
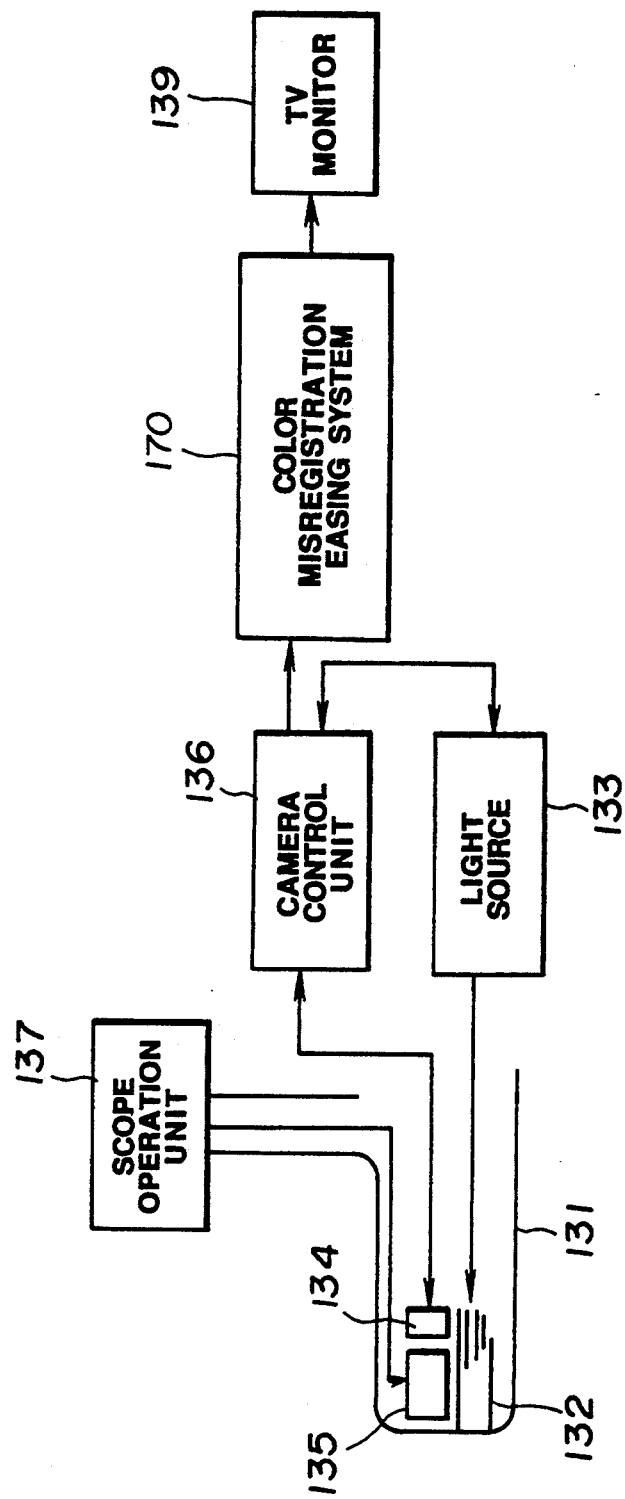
FIG. 35 is an overall configuration diagram of an electronic endoscope system.

A color misregistration easing system 25 shown in FIG. 5 is installed on behalf of a color misregistration easing system 170 in an electronic endoscope system shown in FIG. 35. The color misregistration easing system 25 is connected to a field sequential imaging type electronic endoscope 161, which converts an electric signal sent from a solid state imaging device 164 mounted at the distal end of the electronic endoscope 161 into a standard video signal, and outputs the converted signal selectively as a signal with color misregistration corrected or a uncorrected signal.

The color misregistration easing system 25 includes synthesizing circuits 11A and 11B instead of selecting circuits 27A and 27B in a system shown in FIG. 2. However, ROM table 8A and 8B in the system shown in FIG. 2 are excluded from the components of the color misregistration easing system 25. The color misregistration easing system 25 further includes a color misregistration detector 26 for detecting color misregistration in an image the solid state imaging device 164 produces. The color misregistration detector 26 issues an instruction to vary a signal synthetic ratio for color misregistration correction or selectively output a signal with color misregistration corrected or an uncorrected signal.

The color misregistration detector 26 comprises a matrix circuit 1, differentiating circuits 16A and 16B, comparators 17A and 17B, a counter circuit 23, and a CPU 24.

The other components identical to those of the first embodiment are assigned the same numerals. Then, the components as well as the operation identical to that of the first embodiment will not be described.

Differentiating circuits 16A and 16B detect quantities of changes in color difference signals R-Y and B-Y a matrix circuit 1 outputs.

In general, a living body or a subject (normal image) has a reddish color tone. Therefore, when a subject (indicated with a circle) moves in a normal image as shown in FIG. 8, there are few points at which color differences change. Then, the quantities of changes are relatively stable and constant when checked either within a screen or time-sequentially from screen to screen.

On the other hand, an image having intense color misregistration such as an image produced during water supply (hereafter, water supply image) as shown in FIG. 9 has many points within a screen (edge points) at which color differences change. This kind of image is characterized by a large time-sequential change in the number of points at which color differences change or a large change in the number of color difference edges.

FIG. 10 shows a time-sequential change in the number of points at which color differences change or in the quantities of changes in color differences for images shown in FIGS. 8 and 9.

Differentiating circuits 16A and 16B detect quantities of changes in color differences. Then, comparators 17A and 17B detect quantities of changes exceeding prescribed levels. In this embodiment, the differentiating circuits 16A and 16B may be replaced by a difference circuit for calculating a difference between outputs of A/D converters 3A and 3B. The difference circuit processes data on a pixel basis and, therefore, provides quantities of changes in color differences of pixels.

The quantities of changes in color differences the comparators 17A and 17B detect are converted into counts of the numbers of edges of color differences by a counter circuit 23.

A CPU 24 monitors time-series changes in the counts the counter circuit 23 outputs, and determines whether a current image is an image causing intense color misregistration due to water supply or suction or a normal image showing a slowly moving mucosa. Thus, a color misregistration determinating means is made up of the counter circuit 23 and CPU 24.

Then, the CPU 24 switches an analog switch 15 according to the result of the determination.

Based on the data the counter circuit 23 supplies or a time-sequential change in the number of points at which color differences change drastically, the CPU 24 provides the synthesizing circuits 11A and 11B with a coefficient K for varying a synthetic ratio of a raw image made up of the outputs of 1H line memories 4A and 4B to a correction image made up of the outputs of image memories 7A and 7B.

FIG. 6 shows an example of a configuration of each of the synthesizing circuits 11A and 11B.

A coefficient K a CPU 24 provides is data in the range of $0 \leq K \leq 1$. A synthesizing circuit 11A or 11B has a multiplier 11a for multiplying data of a 1H line memory 4A or 4B by the coefficient K, an arithmetic unit 11b for converting the coefficient K into a coefficient $(1-K)$, and a multiplier 11c for multiplying data of an image memory 7A or 7B by the coefficient K. The synthesizing circuit 11A or 11B has an adder 11d for adding up the results of multiplication the multipliers 11a and 11c provide. The adder 11d outputs a synthetic ratio varying depending on the coefficient K. The synthesizing circuits 11A and 11B may be formed with digital signal processors (DSP) or ROM tables to perform the aforesaid operations.

The CPU 24 controls or time-sequentially varies, as shown in FIG. 7, the value of the coefficient K according to the result of the determination or in association with various color misregistration occurrence patterns. In FIG. 7, hatched areas indicate ratios of a last image used for correction (color difference data read from the image memories 7A and 7B).

Assuming that a normal mucosal image or an image having no color misregistration is acquired, the CPU 24 sets the coefficient K to, for example, a 1, then outputs the 1 to the synthesizing circuits 11A and 11B. Then, the output of an arithmetic logic unit 11b becomes a 0.

The multiplier 11a for the synthesizing circuits 11A and 11B passes the outputs of the 1H line memories 4A and 4B as they are and thus supplies them to the adder 11d, while the multiplier 11c does not supply the data of the image memories 7A and 7B to the adder 11d. Thereby, a raw image is supplied from the synthesizing circuits 11A and 11B as it is.

Assume that water is supplied rapidly. The CPU 24 checks a count output and becomes aware that quantities of changes in color differences or the number of pixels having color misregistration is large. When detecting a rapid start of water supply, the CPU 24 greatly reduces the coefficient K from a 1. Therefore, the coefficient for the multiplier 11a becomes much smaller, while the coefficient for the multiplier 11c becomes much larger. Thereby, as seen from the pattern 1 of FIG. 7, a synthetic ratio of a last image increases greatly.

When water supply terminates slowly, the CPU 24 varies the coefficient K relatively slowly. As seen from the pattern 2, a synthetic ratio of a last image decreases slowly.

When a normal mucosa is observed, conspicuous color misregistration hardly occurs. If framing is altered abruptly because of movement of an imaging device, a synthetic ratio is changed as indicated with the pattern 3. In this case, a correction image provided by the synthesizing circuits 11A and 11B may not be formed with a last image alone.

Correction signals in each of which a raw image and a correction image are synthesized by the synthesizing circuits 11A and 11B are converted into analog signals by D/A converters 12A and 12B. LPFs 13A and 13B restrict the frequencies of the analog signals to a low band. Then, color difference signals in each of which pixels having intense color misregistration are corrected but those having almost no color misregistration are uncorrected are fed to an inverse matrix circuit 14.

The inverse matrix circuit 14 synthesizes the color difference signals sent from the LPFs 13A and 13B and an uncorrected luminance signal from the matrix circuit 1 to produce an RGB image signal.

An analog switch 15 switches a processed image signal sent from the inverse matrix circuit 14 and an unprocessed image signal in response to a control signal from the CPU 10.

The color misregistration detector 26 of this embodiment detects quantities of changes in color differences of pixels in an image produced by an electronic endoscope 161, and monitors a time-sequential change in the number of regions (points) in which color differences change greatly. Thereby, the color misregistration detector 26 can differentiate conspicuous color misregistration in, for example, a water supply image from inconspicuous color misregistration in, for example, a normal image.

Using the result of the differentiation the color misregistration detector 26 provides, the color misregistration easing system 25 corrects color misregistration with high precision. In addition, since the color misregistration easing system 25 uses a luminance signal of a raw image as it is and corrects only color signals having conspicuous color misregistration, the color misregistration easing system 25 can correct color misregistration to such an extent that a corrected image looks natural to an observer's eyes.

Even when color misregistration varies time-sequentially, the color misregistration easing system 25 changes the correction level for an image to be corrected or the synthetic ratios for the synthesizing circuits 11A and 11B according to a time-sequential change in a quantity of a change in color misregistration. Therefore, even when an animated image is observed, this embodiment can correct color misregistration to such an extent as to maintain naturalness.

Comparators 6A and 6B compare between color difference signals delayed for a four-field period and current color difference signals to determine whether the previous and current image data of R-Y and B-Y are consistent or inconsistent. At this time, inconsistent data whose difference is negligible may also be placed in the image memories 7A and 7B instead of storing only consistent image data in the image memories 7A and 7B.

When water supply is under way or when color misregistration occurs all over a screen, if a current image signal is compared with the one of four fields before, color misregistration pixels may tint the same color accidentally. Therefore, the pixels causing the color misregistration may be identified as still pixels or pixels not causing color misregistration. To avoid this incorrect identification, when water supply is under way or when intense color misregistration occurs, writing in the image memories 7A and 7B for recording a still image or an image showing no change in color differences may be suspended.

Figure 11:
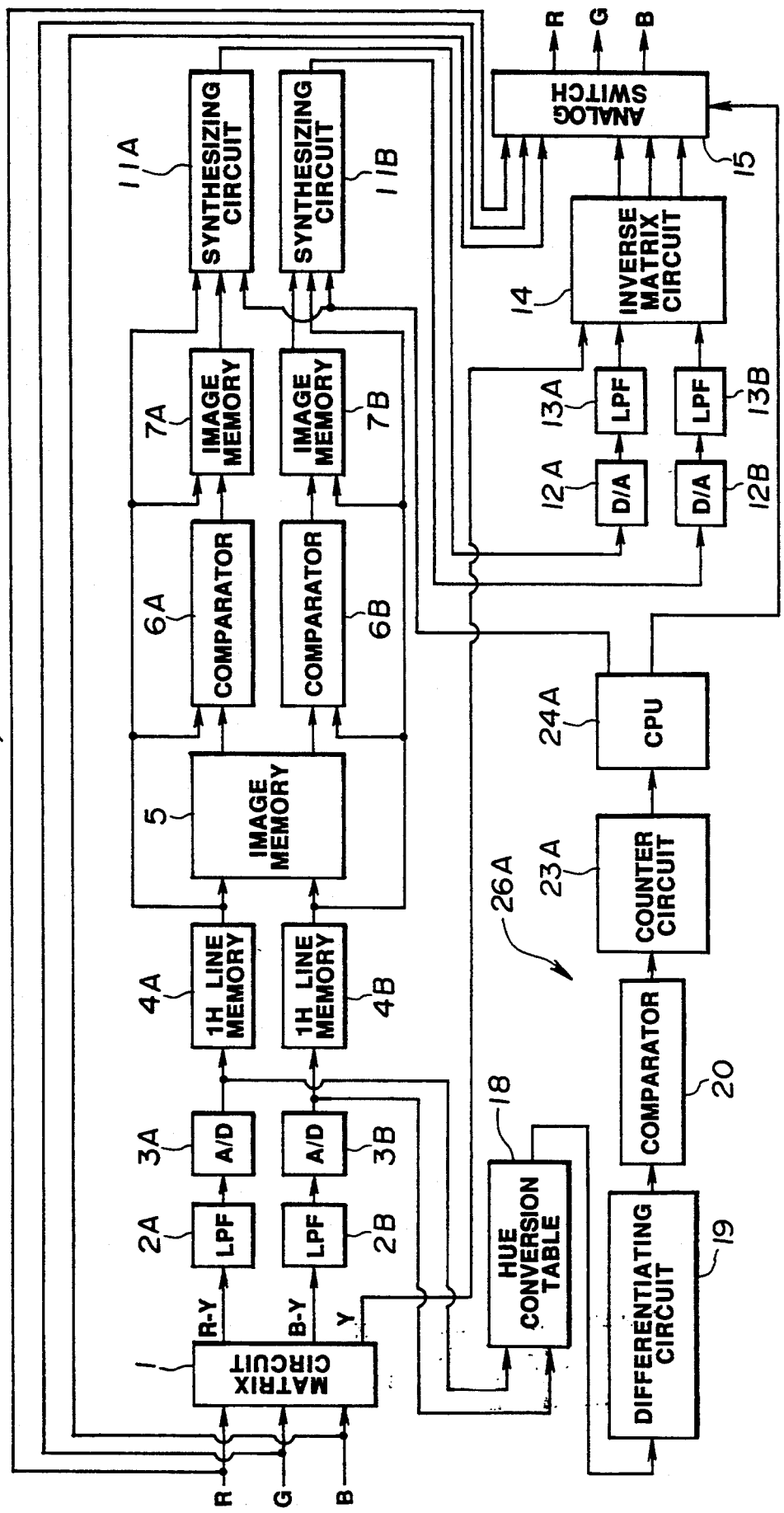
FIG. 11 is an overall block diagram showing a color misregistration easing system including a color misregistration detector of the third embodiment.

FIG. 11 is an overall block diagram of a color misregistration easing system including a color misregistration detector of the third embodiment of the present invention.

In this embodiment, differentiating circuits 16A and 16B, and comparators 17A and 17B in the first embodiment are replaced with a hue conversion table 18 serving as a color element information detecting means, a differentiating circuit 19 serving as a color element information change detecting means, and a comparator 20 serving as a comparing means.

In this embodiment, a counter circuit 23 and a CPU 24 in the second embodiment are replaced with a counter circuit 23A and a CPU 24A.

A color misregistration detector 26A is made up of the hue conversion table 18, differentiating circuit 19, comparator 20, counter circuit 23A, and CPU 24A.

The other components identical to those of the first embodiment are assigned the same numerals. The components and the operation identical to that of the first embodiment will not be described.

As shown in FIG. 11, a color misregistration easing system 25A of this embodiment comprises a hue conversion table 18 formed with a ROM for converting color difference digital signals or outputs of A/D converters 3A and 3B into polar coordinates and calculating a hue, a differentiating circuit 19 for differentiating hue data read from the hue conversion table 18, a comparator 20 for comparing a changes in each hue the differentiating circuit 19 detects with a set value and thus detecting positions at which a hue changes greatly, and a counter circuit 23A for counting the number of regions in which a hue changes greatly the comparator 20 provides.

A difference between a normal image and a water supply image is that a normal image contains a few regions in which a hue changes greatly as shown in FIG. 8 and that an image having intense color misregistration due to water supply or suction contains many regions (change points) in which a hue changes greatly as shown in FIG. 9.

Based on the number of regions in which a hue changes greatly the counter 23A counts, a CPU 24A determines whether a current image is an image having intense color misregistration due to water supply or suction or an image showing a slowly moving normal mucosa. Using the result of the determination, the CPU 24A switches an analog switch 15. The CPU 24A supplies, similarly to a CPU 24 of the first embodiment, a coefficient k to synthesizing circuits 11A and 11B according to a color misregistration occurrence pattern.

In the aforesaid configuration, based on the hue conversion table 18, R-Y and B-Y color difference signal outputs of A/D converters 3A and 3B are converted into polar coordinates to calculate a hue. Then, the hue is supplied to the differentiating circuit 19. The differentiating circuit 19 differentiates hues of pixels calculated using the hue conversion table 18 and works out quantities of changes in hues of pixels.

The comparator 20 compares quantities of changes in hues the differentiating circuit 19 calculates with a prescribed comparison value and detects positions in which a hue changes greatly.

The counter circuit 23A counts the number of regions (hue change points), in which a hue changes greatly, the comparator 20 detects. The number of hue change points the counter circuit 23A counts is checked by the CPU 24A. Then, depending on whether or not the number of hue change points is large, the CPU 24A differentiates a normal image from a water supply or suction image; that is, an image having almost no color misregistration from an image having intense color misregistration.

In this embodiment similarly to the second embodiment, a normal image can be differentiated from a water supply image. Since the differentiation is based on an abrupt change in a hue, it can be implemented easily.

As a variant of this embodiment, saturations may be calculated instead of detecting hues using the hue conversion table 18.

Figure 12:
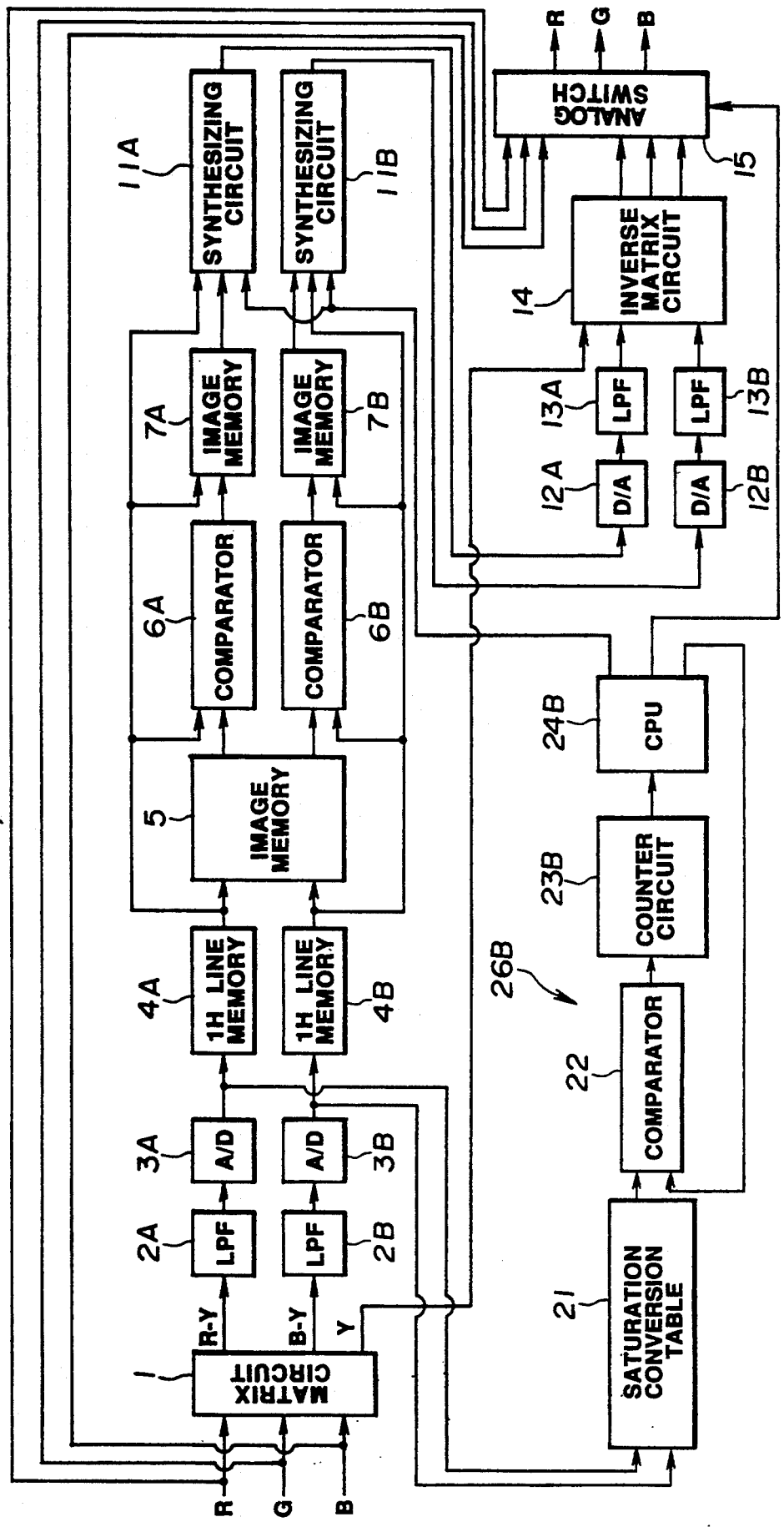
FIG. 12 is an overall block diagram showing a color misregistration easing system including a color misregistration detector of the fourth embodiment.

FIG. 12 is an overall block diagram of a color misregistration easing system including a color misregistration detector of the fourth embodiment of the present invention.

A color misregistration detector 26B of this embodiment has a saturation conversion table 21 serving as a color information detecting means and a comparator 22 serving as a comparing means instead of differentiating circuits 16A and 16B and comparators 17A and 17B of the first embodiment.

The color misregistration detector 26B includes a counter circuit 23B and a CPU 24B serving as a color misregistration identifying means instead of a counter 9 and a CPU 24 of the first embodiment.

The color misregistration detector 26B is made up of the saturation conversion table 21, comparator 22, counter circuit 23B, and CPU 24B. The other components identical to those of the first embodiment are assigned the same numerals. The components and the operation identical to that of the first embodiment will not be described.

As shown in FIG. 12, the color misregistration easing system 25B of this embodiment includes a saturation conversion table 21 formed with a ROM table for converting digital color difference signals sent from A/D converters 3A and 3B into a saturation signal, and a comparator 22 for comparing a saturation calculated using the saturation conversion table 21 with a set value and outputting a 1 when the saturation is larger, and a counter 23B for counting the number of outputs or 1's sent from the comparator 22.

In a normal image, a relatively small area has high saturations or a relatively few pixels showing high saturations. On the other hand, a water supply image has color misregistration with a very high saturation because light reflects entirely in the vicinity of an eyepiece during water supply. Thus, a normal image and a water supply image differ each other in the number of pixels having high saturations.

Based on the number of pixels having high saturations the counter circuit 23B counts, the CPU 24B determines whether or not a current image has intense color misregistration due to water supply. Then, the CPU 24B switches an analog switch 15 according to the result of the determination. The CPU 24B supplies, similarly to a CPU 24 of the first embodiment, a coefficient k to synthesizing circuits 11A and 11B according to a color misregistration occurrence pattern.

In the aforesaid configuration, based on the saturation conversion table 21, R-Y and B-Y digital color difference signals are converted into polar coordinates to calculate a saturation.

The comparator 22 compares a saturation calculated using the saturation table 21 with a set value sent from the CPU 24B. Then, the counter circuit 23B counts the number of results the comparator provides or pixels with high saturations. When the number of pixels with high saturations is large, the CPU 24B becomes aware of water supply and controls synthetic ratios of synthesizing circuits 11A and 11B accordingly.

This embodiment has advantages similar to those the second embodiment has. In addition, a method of correcting color misregistration can be selected depending on a change in a conspicuous high saturation. Eventually, color misregistration can be recognized and corrected properly.

As a variant of this embodiment, hues may be calculated instead of detecting saturations using the saturation conversion table 21.

Figure 13:
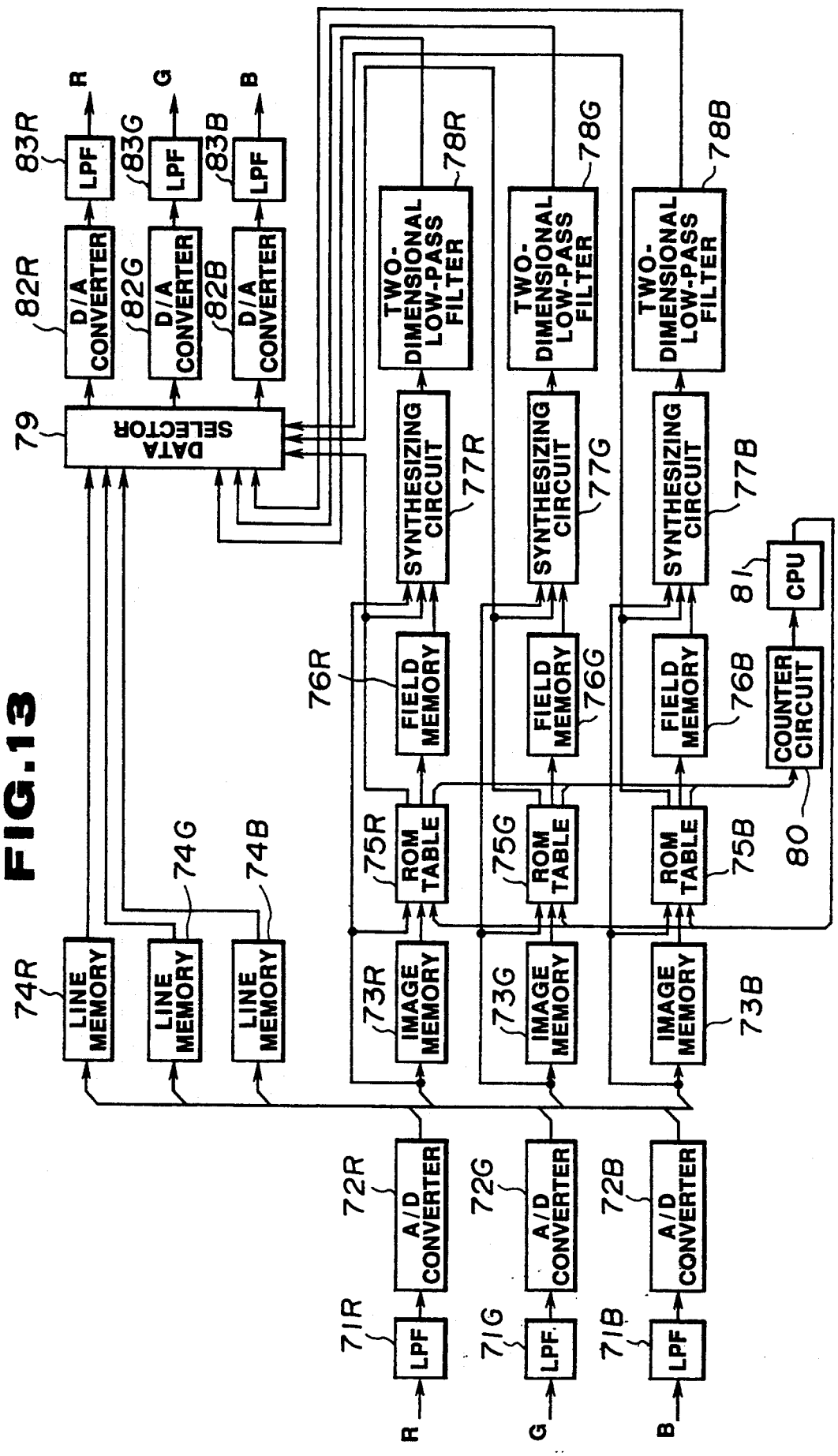
FIG. 13 is an overall block diagram showing a color misregistration easing system including a color misregistration detector of the fifth embodiment.

FIG. 13 shows the fifth embodiment of the present invention, which is an overall block diagram of a color misregistration easing system including a color misregistration detector.

R, G, and B input signals are produced in field sequential mode by an imaging means, which is not shown, divided into frames, then supplied to LPFs 71R, 71G, and 71B. The LPFs 71R, 71G, and 71B restrict the frequencies of the R, G, and B input signals to such an extent that the information of the raw image will not be lost, then output the restricted signals to A/D converters 72R, 72G, and 72B. The A/D converters 72R, 72G, and 72B convert input signals into digital signals, then place the digital signals in image memories 73R, 73G, and 73B, and in line memories 74R, 74G, and 74B. In the line memories 74R, 74G, and 74B, the R, G, and B signals are delayed for a delay time arising in a correction system, then supplied to a data selector 79.

In the image memories 73R, 73G, and 73B, the input R, G, and B data are delayed for a four-field period, then placed in ROM tables 75R, 75G, and 75B. Outputs of the A/D converters 72R, 72G, and 72B are also put in the ROM table 75R, 75G, and 75B. Then, the ROM tables 75R, 75G, and 75B are searched for the quantities of changes in the R, G, and B data of the four-field period before and after. If no change is detected, a consistency detected signal is sent to field memories 76R, 76G, and 76B respectively. The data of quantities of changes detected in the ROM tables 75R, 75G, and 75B are supplied to a counter circuit 80. At the same time, based on the quantities of changes, a CPU 81 determines a coefficient K for each screen. The coefficient K sent from the CPU 81 is supplied to synthesizing circuits 77R, 77G, and 77B according to the quantities of changes from the outputs of the image memories 73R, 73G, and 73B to the outputs of the A/D converters 72R, 72G, and 72B. The CPU 81 controls a data selector 79 on a pixel basis via the ROM tables 75R, 75G, and 75B. In the field memories 76R, 76G, and 76B, the outputs of the A/D converters 72R, 72G, and 72B are placed and R, G, and B data of pixels to which a consistency detected signal is issued are stored at addresses associated with the pixels.

The synthesizing circuits 77R, 77G, and 77B receive the R, G, and B data from the A/D converters 72R, 72G, and 72B, and the R, G, and B data from the field memories 76R, 76G, and 76B. The synthesizing circuits 77R, 77G, and 77B synthesize the R, G, and B data according to the coefficient K, then supply the synthesized data to two-dimensional LPFs 78R, 78G, and 78B. The synthesizing circuits 77R, 77G, and 77B have the same configurations as the synthesizing circuits 11A and 11B shown in FIG. 7. The outputs of A/D converters 72R, 72G, and 72B are supplied to a multiplier 11a, and the outputs of the filed memories 76R, 76b, and 76B are supplied to a multiplier 11b. The coefficients K read from the ROM tables 75R, 75G, and 75B are supplied to the multiplier 11a and to an arithmetic logic unit 11d. On this point, the synthesizing circuits 77R, 77G, and 77B differ from the synthesizing circuits 11A and 11B.

The coefficient K is larger than or equal to 0, and smaller than or equal to 1. The two-dimensional LPFs 78R, 78G, and 78B restrict the spatial frequencies of input data to a low band, then supply the restricted data as three primary color correction signals R', G', and B' to the data selector 79.

On the other hand, the data of quantities of changes fetched from the ROM tables 75R, 75G, and 75B are supplied to a counter circuit 80, too. The counter circuit 80 counts the numbers of pixels for a quantity of a change in each of R, G, and B data, and supplies the count outputs to the CPU 81. Based on the count outputs of the counter circuit 80, the CPU 81 determines the cause of color misregistration. The CPU 81 varies the coefficient K on a time-series basis according to the cause and occurrence situation of color misregistration, and outputs a control signal for controlling the data selector 79 to the ROM tables 75R, 75G, and 75B respectively according to the determined cause of color misregistration.

The ROM tables 75R, 75G, and 75B pass control to the data selector 79. The data selector 79 selects either R, G, and B input data read from the line memories 74R, 74G, and 74B or three primary color correction signals R', G', and B' sent from the two-dimensional LPFs 78R, 78G, and 78B, then outputs the selected data to D/A converters 82R, 82G, and 82B. Herein, the selection is done on a pixel basis in the order of R, G, and B signals. The D/A converters 82R, 82G, and 82B convert the input data into analog signals, then supply the analog signals to LPFs 83R, 83G, and 83B. The LPFs 83R, 83G, and 83B restrict the frequencies of the R, G, and B input signals to a low band, then output the restricted signals.

Next, the operations of the embodiment having the aforesaid configuration will be described with reference to FIG. 4.

R, G, and B signals entering LPFs 71R, 71G, and 71B are restricted to a low band, then supplied to A/D converters 72R, 72G, and 72B. The A/D converters 72R, 72G, and 72B convert the R, G, and B data into digital signals. The converted R, G, and B signals are placed in image memories 73R, 73G, and 73B. In the image memories 73R, 73G, and 73B, the R, G, and B signals are delayed for a period in which the R, G, and B signals stored are updated; that is, a four-field period, then supplied.

The R, G, and B data recorded in the image memories 73R, 73G, and 73B, and R, G, and B raw image data are compared using ROM tables 75R, 75G, and 75B. When the ROM tables 75R, 75G, and 75B indicate that data of the four-field period before and after are consistent, color misregistration has not occurred on the R, G, and B axes. Then, a consistency detected signal is sent to field memories 76R, 76G, and 76B respectively. Thereby, the consistent data are written in the field memories 76R, 76G, and 76B. That is to say, the R, G, and B data of a last image acquired before occurrence of color misregistration are stored on a pixel basis for each of the R, G, and B axes.

The data of quantities of changes read from the ROM tables 75R, 75G, and 75B are supplied to a counter circuit 80. The counter circuit 80 counts the number of pixels for each of the quantities of changes. A CPU 81 checks the outputs of the counter circuit 80 to identify the cause and quantity of color misregistration. When the results of comparison using the ROM table 75R, 75G, and 75B demonstrate that the quantities of changes are large, a coefficient K sent from the CPU 81 are supplied to the synthesizing circuit 28R, 28G, and 28B via the ROM tables 75R, 75G, and 75B according to the quantities of changes. The synthesizing circuits 28R, 28G, and 28B synthesize the R, G, and B data recorded in field memories 27R, 27G, and 27B before occurrence of color misregistration with the R, G, and B raw data according to the quantities of changes. When the CPU 81 determines that relatively intense color misregistration has occurred due to water supply, the CPU 81 controls the ROM tables 75R, 75G, and 75B, and instructs the data selector 79 to select the three primary color correction signals R', G', and B' sent from two-dimensional LPFs 78R, 78G, and 78B.

In this embodiment similarly to the second embodiment, the coefficient K is controlled on a time-series basis. That is to say, when torrential water supply starts, the coefficient K is increased sharply. Then, as indicated with a pattern 1 in FIG. 7, the synthetic ratios of R, G, and B data read from field memories 76R, 76G, and 76B are increased sharply. When water supply terminates gradually, the synthetic ratios of the R, G, and B data read from the field memories 76R, 76G, and 76B are reduced gradually as indicated with a pattern 2 in FIG. 12. When an imaging device is moved and framing is changed drastically, the synthetic ratios are varied according to a pattern 3 of FIG. 7.

Thereby, when a screen free from color misregistration is shifted to a screen having intense color misregistration, or vice versa, the R', G', and B' correction data sent from the synthesizing circuits 77R, 77G, and 77B are transferred from screen to screen smoothly. This results in easy-to-see images.

Furthermore, in this embodiment, two-dimensional LPFs 78R, 78G, and 78G are employed to provide spatially smooth images. The two-dimensional LPFs 78R, 78G, and 78B restrict the horizontal and vertical frequencies of the outputs of the synthesizing circuits 77R, 77G, and 77B to a low band. This smoothens the borders between an area having terrible color misregistration and an area free from color misregistration on the same screen. Thus, natural and easy-to-see images are produced. The three primary color correction signals R', G', and B' sent from the two-dimensional LPFs 78R, 78G, and 78B are supplied to a data selector 79. The data selector 79 is controlled via the ROM tables 75R, 75G, and 75B. For a pixel not causing color misregistration, the data selector 79 selects R, G, and B raw data that are not restricted to a low band and are contained in line memories 74R, 74G, and 74B. For a pixel causing color misregistration, the data selector 79 selects the outputs of the two-dimensional LPFs 78R, 78G, and 78B.

The R, G, and B data sent from the data selector 79 are converted into digital signals by D/A converters 82R, 82G, and 82B, then restricted to a low band by LPFs 83R, 83G, and 83B.

As described above, in this embodiment, detection and correction of color misregistration are carried out using three primary color signals R, G, and B. The embodiment provides the same advantages as the first embodiment, and permits temporal and spatial smoothening correction. Thus, natural correction images are produced.

Figure 14:
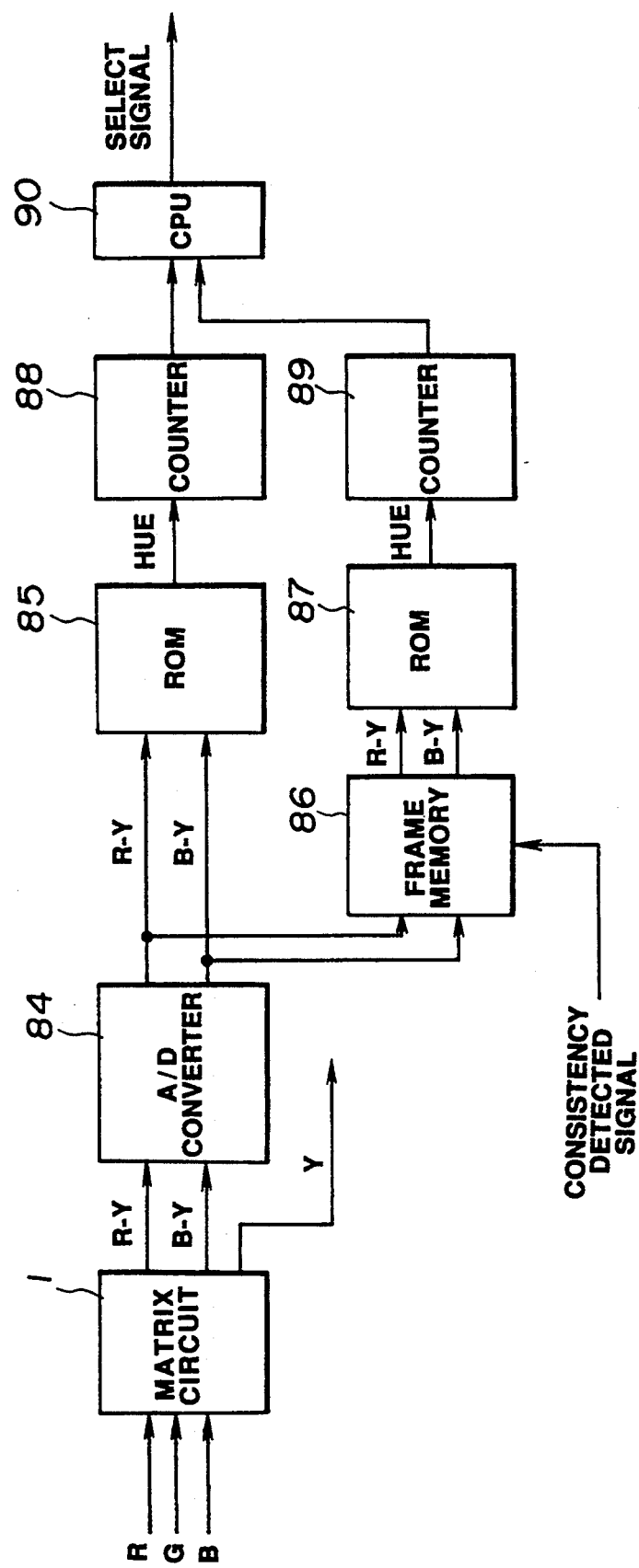
FIG. 14 is an overall block diagram showing a color misregistration easing system including a color misregistration detector of the sixth embodiment.

FIGS. 14 to 16 relate to the sixth embodiment of the present invention. FIG. 14 is a block diagram of a color misregistration detector. FIG. 15 is an explanatory diagram showing color distributions of a normal image and a water supply image, and segments. FIG. 16 is an explanatory diagram showing color distributions of a color bar in still and animated modes, and segments.

This embodiment is a color misregistration detector for producing a select signal for controlling an analog switch 15 in each of the aforesaid embodiments.

A matrix circuit 1 inputs R, G, and B signals sent from a field sequential type electronic endoscope. The matrix circuit 1 decomposes the input R, G, and B signals into color difference signals R-Y and B-Y, and a luminance signal Y, then outputs the color difference signals R-Y and B-Y to an A/D converter 84. The A/D converter 84 converts input data into digital signals, then outputs the digital signals.

A frame memory 86 has the same operation as image memories 7A and 7B or a frame memory 54 in the aforesaid embodiments. In response to a consistency detected signal is supplied on a pixel basis, color difference data R-Y and B-Y of pixels not causing color misregistration are selected from the outputs of the A/D converter 84, and stored in the frame memory 86. The color difference data R-Y and B-Y from the A/D converter 84 are placed in a ROM 85, the color difference data R-Y and B-Y read from the frame memory 86 are placed in a ROM 87. Hues associated with the input color difference data R-Y and B-Y are retrieved from the ROMs 85 and 87, then supplied to counters 88 and 89.

Each of the counters 88 and 89 classifies hues into multiple hue segments, and counts hues of pixels read from the ROM 85 or 87 in segments. That is to say, the counters 88 and 89 count the numbers of pixels in the same hue segments for each screen. The CPU 90 checks the count outputs of the counters 88 and 89 to identify the cause of color misregistration.

Next, the operations of this embodiment having the aforesaid configuration will be described.

Color difference signals R-Y and B-Y a matrix circuit 1 has decomposed are converted into digital signals by an A/D converter 84. In a ROM 85, the color difference data R-Y and B-Y sent from the A/D converter 84 are transferred into polar coordinates, and thus a hue is identified on a pixel basis. On the other hand, with a consistency detected signal, color difference data R-Y and B-Y of a last image acquired before occurrence of color misregistration are fetched from the A/D converter 84 into a frame memory 86. In the ROM 87, the color difference data R-Y and B-Y read from the frame memory 86 are transferred into polar coordinates, and thus a hue is identified on a pixel basis. In short, the hue of each pixel of a raw image is read from the ROM 85, and the hue data of each pixel of a still image of a subject is read from the ROM 87.

The counters 88 and 89 count hues read from the ROMs 85 and 87 respectively, and calculates the numbers of pixels in the same hue segments. The CPU 90 checks the count outputs to identify the cause of color misregistration. FIGS. 15 and 16 are graphs the CPU 90 references to identify a cause of color misregistration. A distribution of chromaticities of all pixels in a screen is expressed on a color difference plane.

Figure 15A:
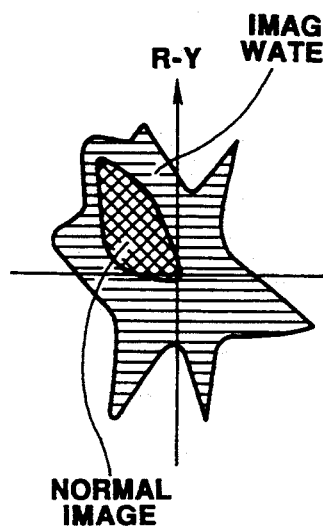
FIGS. 15(a) and 15(b) are explanatory diagrams showing color distributions in a normal image and a water supply image portion, and distribution segments.

In an endoscopic image, in general, chromaticities of pixels are distributed in a narrow range of red tones as shown with a meshed area in FIG. 15a. On the other hand, when a field sequential type electronic endoscope executes water supply, a distribution of chromaticities of pixels expands widely on the color difference plane as shown with a hatched area in FIG. 15a. During water supply, the chromaticity distribution varies drastically on a time-series basis. As described previously, an examining doctor suffers fatigued eyes.

Figure 16A:
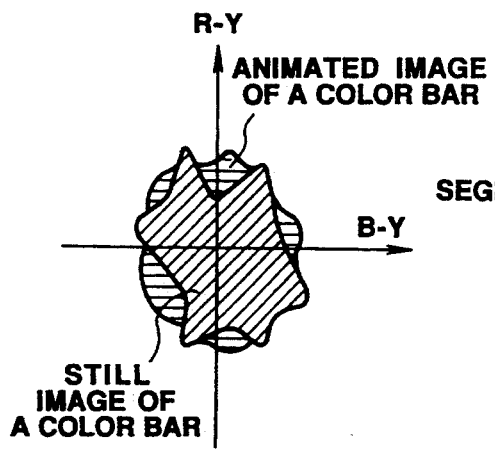
FIGS. 16(a) and 16(b) are explanatory diagrams showing color distributions in a color bar in still and animated modes, and distribution segments.

On the other hand, the chromaticity distribution of a color bar chart expands relatively widely as shown with a hatched area in FIG. 16a. When the color bar chart moves to cause color misregistration, as shown with a striped area in FIG. 16a, the chromaticity distribution on the color difference plane varies little. In other words, color misregistration is hardly discernible.

Thus, a chromaticity distribution of a screen on a color difference plane varies depending on the cause of color misregistration. When the color bar chart is moved, quantities of shifts of pixels on the color difference plane are as large as those when water supply is under way. Therefore, whether or not color misregistration is derived from water supply cannot be determined merely by monitoring the quantities of shifts on the color difference plane. Therefore, in this embodiment, the numbers of pixels in the same hue segments are counted to detect the chromaticity distribution of a screen.

Figure 15B:
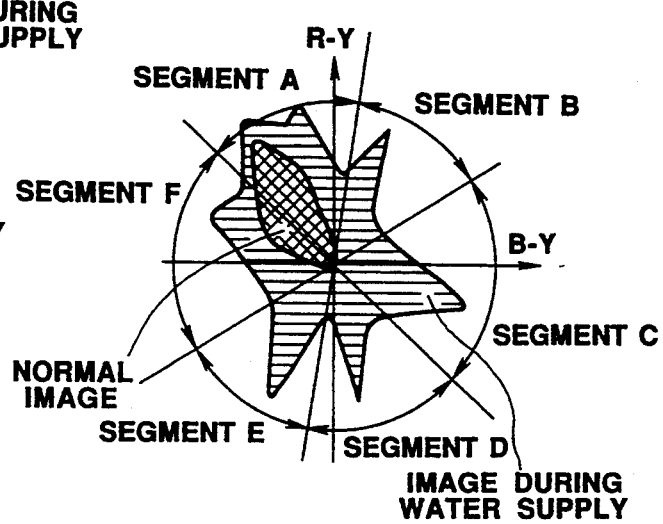
Figure 16B:
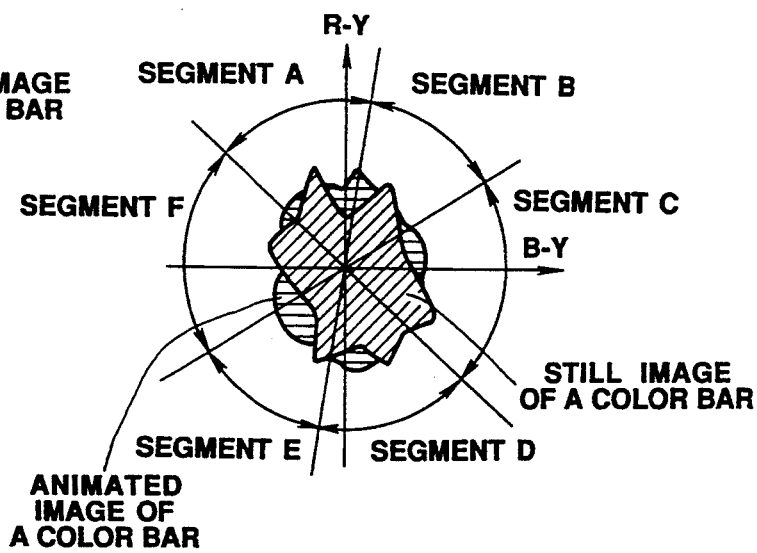

For instance, counters 88 and 89 classify hues into six hue segments A to F shown in FIGS. 15b and 16b, then count the numbers of pixels in the same hue segments. A CPU 90 compares the counts of the counters 88 and 89 for each of the segments A to F. In other words, the CPU 90 compares a hue distribution of a raw image with a hue distribution of a last image acquired before occurrence of color misregistration for each of the segments A to F. The CPU 90 calculates a ratio between the counts for each of the segments A to F, then checks the calculated ratios to identify a cause of color misregistration. For instance, when a normal image is shifted to a water supply image or other image with conspicuous color misregistration, distributions of hues vary drastically at the occurrence of color misregistration. Therefore, the ratios between the numbers of pixels become relatively large. On the contrary, when inconspicuous color misregistration occurs, hue distributions vary little at the occurrence of color misregistration. Therefore, the ratios between the numbers of pixels become relatively small. The CPU 90 produces a select signal depending on whether the ratio between each pair of the numbers of pixels exceeds a set value.

In the sixth embodiment, a ratio between variances of each hue is calculated. This further improves precision in identifying a cause of color misregistration. A variance of a hue is given as the following expression (1):

$$V = (x_i - \bar{x}^2)/(n-1) \quad (1)$$

where, $x_i$ represents a hue of each pixel, $\bar{x}$, an average hue, and n, the number of pixels.

A CPU 90 calculates a ratio F of a variance $V_1$ of a hue of a raw image to a variance $V_2$ of a hue of a last image using the expression (1) ($=V_1/2$). If the ratio of a hue variance, F, is smaller than 1, the CPU 90 outputs a select signal for outputting R, G, and B signals of a raw image. If the F is larger than 1 (F<1 to 3 or more), the CPU 90 outputs a select signal for outputting three primary color correction signals R′, G′, and B′.

As described above, this embodiment enables differentiation of conspicuous color misregistration from inconspicuous color misregistration which is impossible merely by checking distances of movements of pixels on a color difference plane.

In this embodiment, color difference signals R-Y and B-Y are used as color information for detecting a cause of color misregistration and correcting color misregistration. Color signals in other color space may be employed to detect, for example, changes on an I axis and a Q axis. Color signals in a color space of a U or V chromaticity or xy chromaticity coordinate system, or in an L*a*b*, HSI, or RGB color space may be employed.

Figure 18:
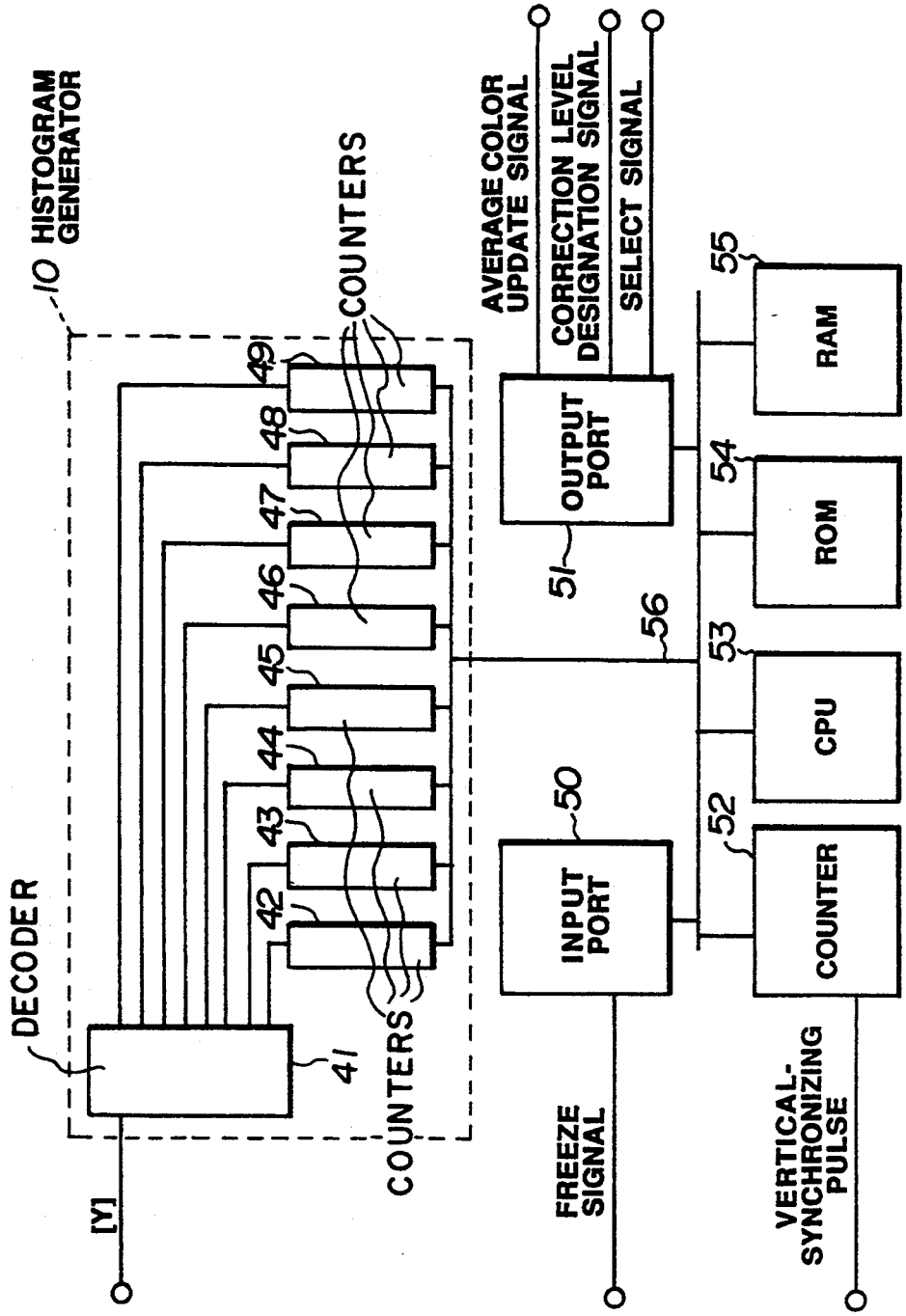
FIG. 18 is a block diagram showing a configuration of a color misregistration detector.
Figure 19:
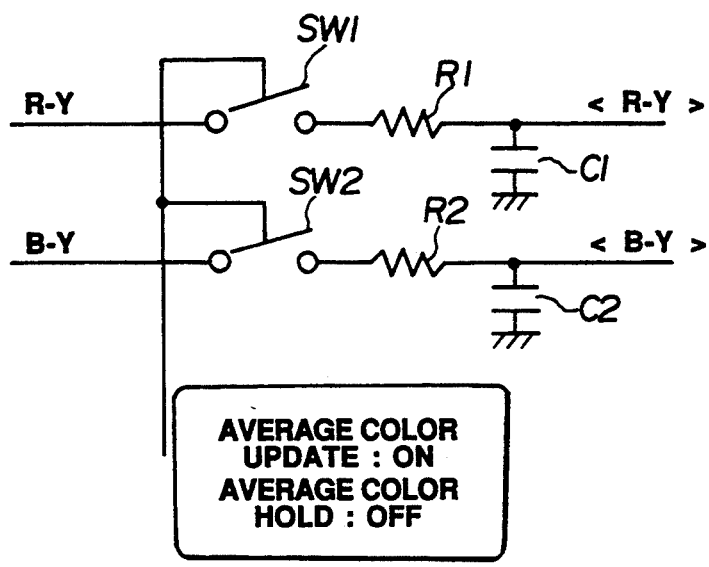
FIG. 19 is a circuit diagram of an average color calculating circuit.
Figure 20:
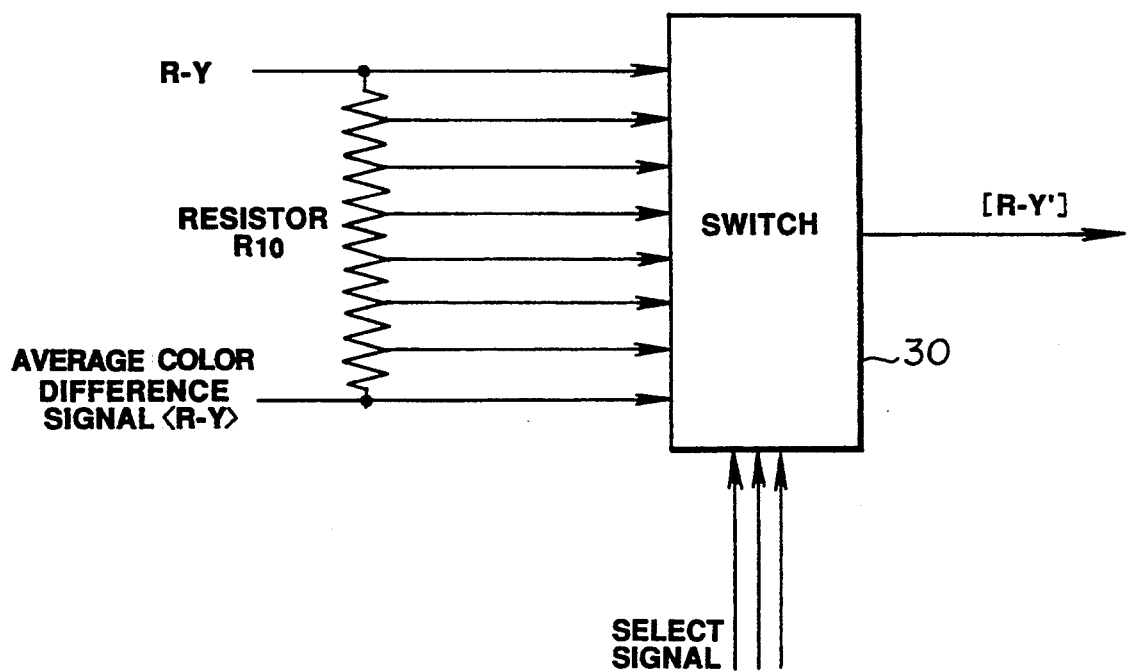
FIG. 20 is a block diagram showing a configuration of a synthesizing circuit.
Figure 21:
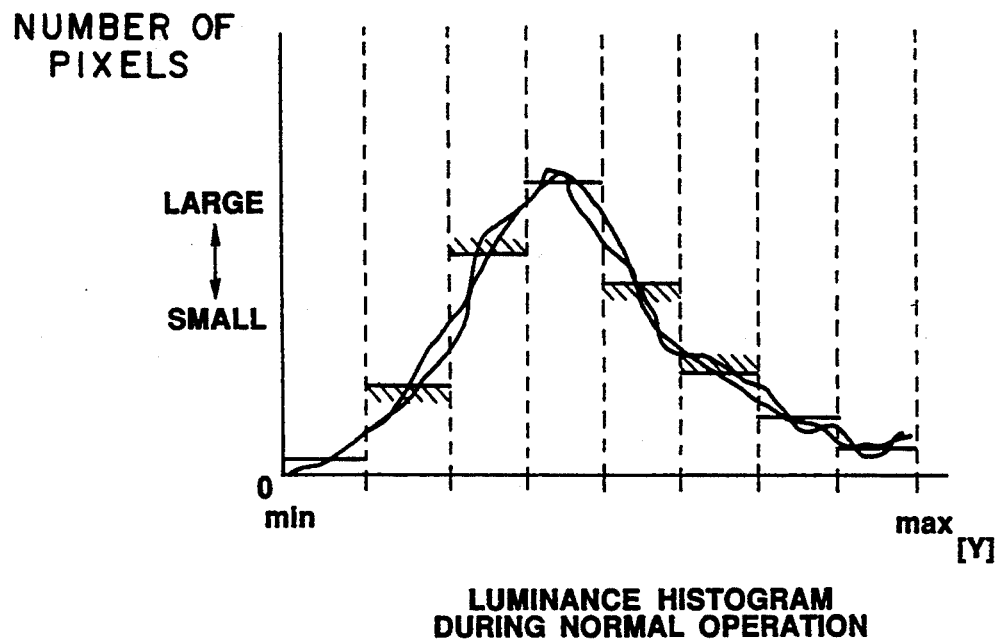
FIGS. 21a and bI are explanatory diagrams for explaining how to detect water supply.
Figure 21:
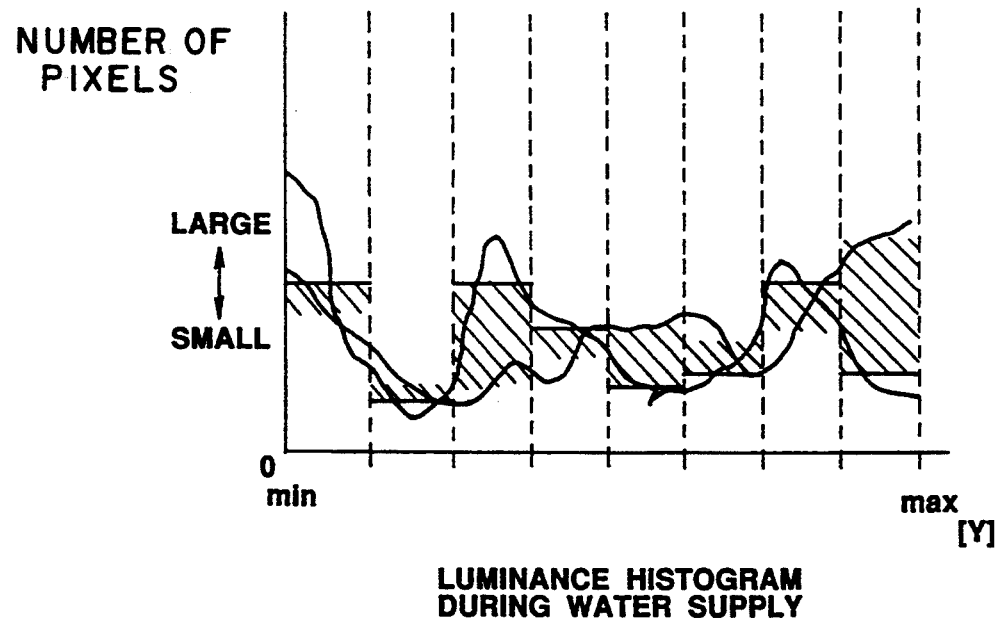
Figure 22:
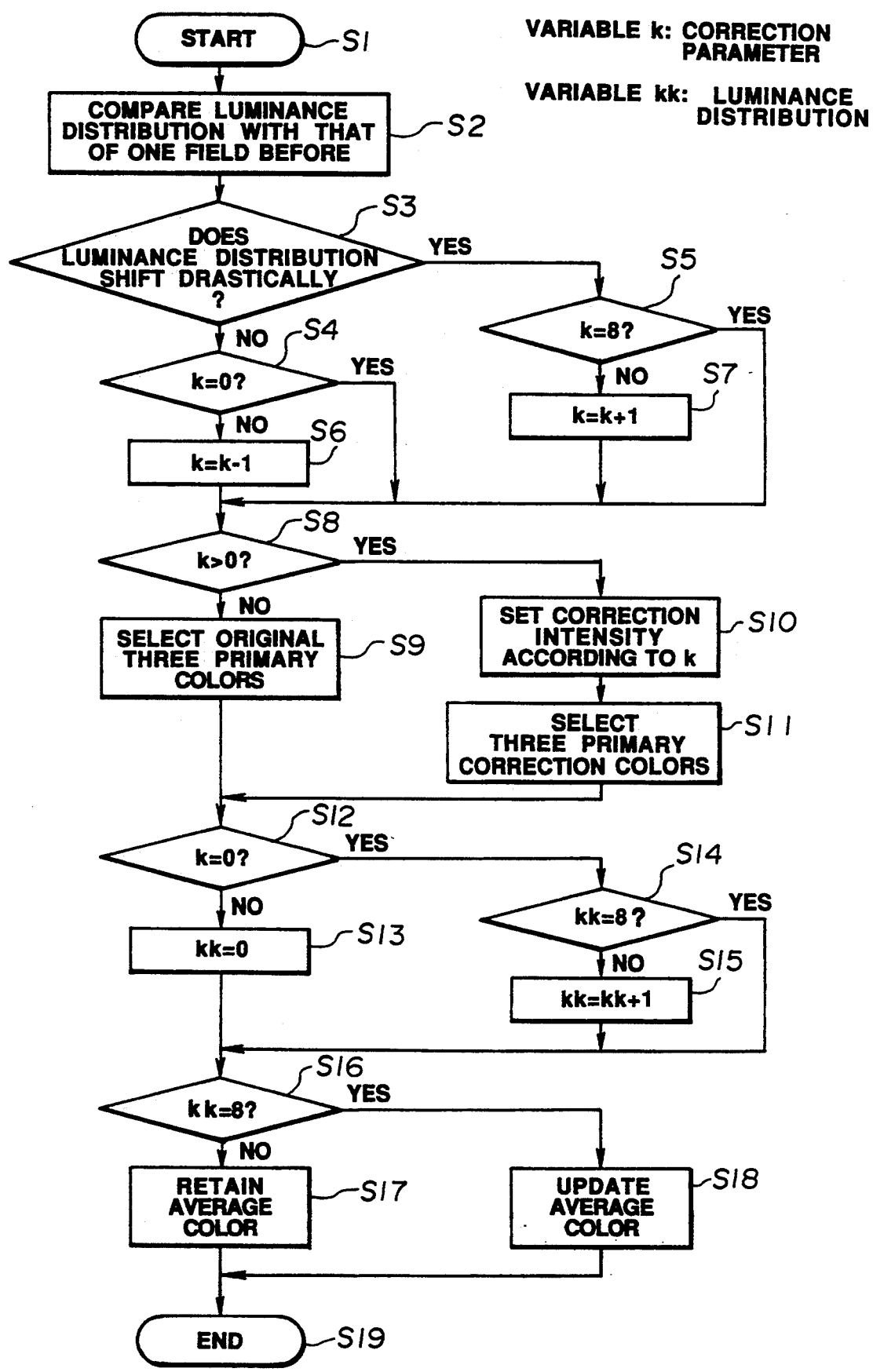
FIG. 22 is a flowchart for average color change and correction level setting.
Figure 24:
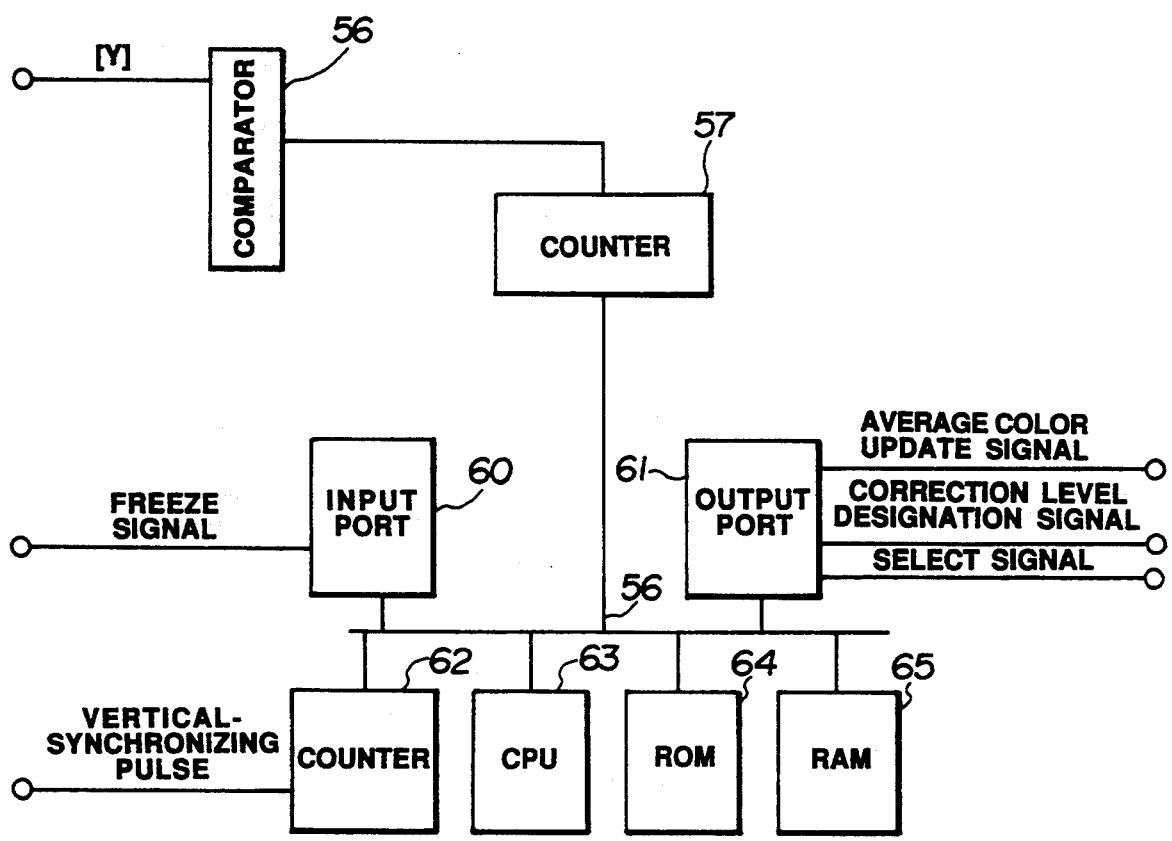
FIG. 24 is a block diagram showing a configuration of a variant of a color misregistration detecting means.
Figure 25:
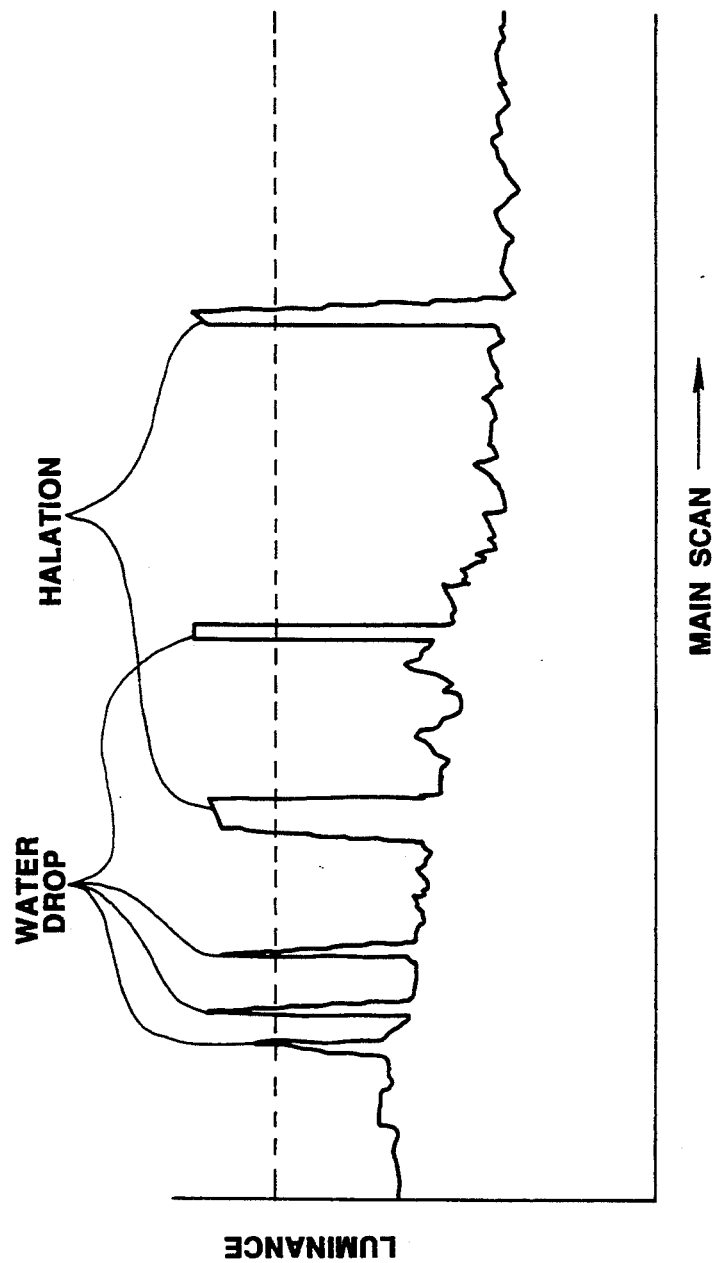
FIG. 25 is an explanatory diagram for explaining generation of high luminance pulses.

FIGS. 17 to 25 show the seventh embodiment of the present invention. FIG. 17 is an overall configuration diagram of the seventh embodiment. FIG. 18 is a block diagram showing a configuration of a color misregistration detecting means. FIG. 19 is a circuit diagram of an average color calculating circuit. FIG. 20 is a circuit diagram showing an example of a configuration of a synthesizing circuit. FIG. 21 is an explanatory diagram for explaining how to detect water supply. FIG. 22 is a flowchart for average update and correction level setting. FIG. 23 plots relationships between the correction parameter and the correction level, and state transitions. FIG. 24 is a block diagram showing a configuration of a variant of a color misregistration detecting means. FIG. 25 is an explanatory diagram for explaining generation of high-luminance pulses.

A color misregistration detector comprises, as shown in FIG. 17, a video circuit 31 for using an image signal acquired using, for example, an electronic endoscope which is not shown to produce three primary color signals R, G, and B making up a video signal, an encoder 32 for using the three primary color signals R, G, and B sent from the video circuit 31 to produce a luminance signal Y and color difference signals R-Y and B-Y, an average color calculating circuit 33 for integrating the color difference signals R-Y and B-Y sent from the encoder 32 to provide color difference signals <R-Y> and <B-Y>, a synthesizing circuit 34 for synthesizing the color difference signals R-Y and B-Y sent from the encoder 32 and the average color difference signals <R-Y> and <B-Y> sent from the average color calculating circuit 33 to produce synthetic color difference signals [R-Y] and [B-Y], a decoder 35 for using the synthetic color difference signals [R-Y] and [B-Y] sent from the synthesizing circuit 34 and the luminance signal Y sent from the encoder 32 to produce three primary color false signals R′, G′, and B′, a selector 6 for selecting either the three primary color false signals R′, G′, and B′ sent from the decoder 35 or the three primary color signals R, G, and B sent from the video circuit 31 and outputting the selected signals as output signals r, g, and b, an A/D converter 37 for converting the luminance signal Y sent from the encoder 32 into a digital signal, and a color misregistration detecting means 38 for checking, for example, a change in the digital luminance signal [Y] sent from the A/D converter 37 to see if water supply is performed at the distal end of the endoscope, and generating a correction level designation signal for designating synthetic ratios of color difference signals R-Y and B-Y to average color difference signals <R-Y> and <B-Y> in the synthesizing circuit 34. The selector 6 is formed with, for example, a semiconducting video switch.

Specifically, three primary color signals R, G, and B sent from a video circuit 31 are applied to one of the inputs of a selector 6. Three primary color false signals R′, G′, and B′ sent from a decoder 35 are applied to the other input.

The three primary color signals R, G, and B are also fed to an encoder 32. Then, a luminance signal Y and color difference signals R-Y and B-Y are generated. The luminance signal Y is fed to the decoder 35, and converted into a digital luminance signal by an A/D converter 37. The digital luminance signal is fed to a color misregistration detecting means 38. On the other hand, the color difference signals R-Y and B-Y are fed to an average color calculating circuit 33 for calculating an average color and to a synthesizing circuit 34 for synthesizing the average color.

The average color calculating circuit 33 integrates input color difference signals R-Y and B-Y to provide average color difference signals <R-Y> and <B-Y>. The average color difference signals <R-Y> and <B-Y> are fed to the synthesizing circuit 34. The synthesizing circuit 34 inputs real-time color difference signals R-Y and B-Y and average color difference signals <R-Y> and <B-Y>, synthesizes these signals according to synthetic ratios based on a correction level designation signal sent from the color misregistration detecting means 38, then produces synthetic color difference signals [R-Y] and [B-Y]. The synthetic color difference signals [R-Y] and [B-Y] are fed to the decoder 35. That is to say, the decoder 35 inputs synthesized color difference signals [R-Y] and [B-Y] and a real-time luminance signal Y defining the luminance level. and produces three primary color false signals R′, G′, and B′.

A select signal sent from the color misregistration detecting means 38 is fed to the selector 6. Then, either three primary color signals R, G, and B or three primary color false signals R′, G′, and B′ are selectively fed to a display which is not shown.

An update signal sent from the color misregistration detecting means 38 is fed to the average color calculating circuit 33. Then, only when a normal screen is identified, an average color is updated.

The color misregistration detecting means 38 outputs a correction level designation signal which is fed to the synthesizing circuit 34.

FIG. 18 shows a configuration of a color misregistration detecting means 38.

As shown in FIG. 18, a color misregistration detecting means 38 has a histogram generator 10 for inputting a digitized luminance signal [Y] and producing a histogram showing a distribution of luminance of pixels of an endoscope for each field.

In the histogram generator 10, first, a luminance signal [Y] digitized by an A/D converter 37 is fed to a decoder 41. The decoder 41 selects a counter that is to count up from among counters 42 to 49. A counter the decoder has selected counts pixels.

The outputs of the eight counters 42 to 49 are transferred on a bus 26 and enabled to go out when needed. An input port 50, an output port 51, a counter 52, a CPU 53, a ROM 54, and a RAM 55 are also connected over the bus 26. A freeze signal sent from an endoscope which is not shown is fed to the input port 50. In still mode, three original colors can be supplied promptly.

An average update signal, a correction level designation signal, and a select signal are supplied from an output port 51. The average update signal is fed to an average color calculating circuit 33. The correction level designation signal is fed to a synthesizing circuit 34. The select signal is fed to a selector 6. The counter 52 receives a vertical-synchronizing signal from the endoscope which is not shown, then issues an interrupt to a CPU 53 via the bus 26 at regular intervals so that the CPU 53 will execute a water supply detection program. The ROM 54 contains the water supply detection program the CPU 53 executes, from which the water supply detection program is read by the CPU 53. From and in the RAM 55, variables of the program and a histogram history are read and written by the CPU 53.

As shown in FIG. 19, in the average color calculating circuit 33, input color difference signals R-Y and B-Y are applied to switches SW1 and SW2 which are interlocked. LPFs made up of resistors R1 and R2, and capacitors C1 and C2 are connected on the opposite sides of the switches. A time constant for each of the LPFs is set to, for example, three fields. While the switches SW1 and SW2 are on, average color difference signals <R-Y> and <B-Y> are calculated. The average color difference signals <R-Y> and <B-Y> are fed to a decoder 35.

FIG. 20 shows an example of a configuration of a synthesizing circuit 34.

FIG. 20 shows an example of half of a synthesizing circuit 34 or a circuit for processing an R-Y signal. A real-time color difference signal R-Y and an average color difference signal <R-Y> are connected via a resistor R10. The resistor R10 is divided into seven portions. Intermediate contacts of the resistor R10 are connected to a switch 30. The switch 30 outputs either of the aforesaid input signals according to a correction level designation signal fed as a select signal. That is to say, a higher correction level results in a value closer to an average color difference signal <R-Y>. A lower correction level results in a value closer to a real-time color difference signal R-Y.

A circuit similar to the one mentioned above is installed to process a color difference signal B-Y.

A color misregistration detecting means 38 outputs an average color update signal to an average color calculating circuit 33, a select signal to a selector 36, and a correction level designation signal to a synthesizing circuit 34 according to the flowchart shown in FIG. 22. A counter 52 in the color misregistration detecting means 38 issues an interrupt to a CPU 53 in response to an input vertical-synchronizing signal. The CPU 53 reads the contents of counters 42 to 49, then resets the counters 42 to 49. Then, the CPU 53 starts executing a water supply detecting program that resides in a ROM 54 and operates according to the flowchart shown in FIG. 22. The operations of the program will be described below.

The program starts at a step 1 (S1). First; the values of counters 42 to 49 indicating a luminance distribution for one field are recorded in a RAM 55 at S2. Then, a difference from a luminance distribution of one field before is calculated. During normal operation, a luminance distribution hardly differs from field to field as shown in FIG. 21a. During water supply, a luminance distribution varies drastically from field to field as shown in FIG. 21b. Therefore, in this embodiment, luminances are classified into eight levels at S3 to S7. Then, a sum of differences between pairs of the numbers of pixels belonging to the levels is checked to see if water supply is under way. Therefore, if a luminance distribution shifts drastically, it is determined that color misregistration due to water supply is highly possible. Then, a correction parameter k is incremented (S7). However, the correction parameter k is restricted not to exceed 8 (S5). On the contrary, if a luminance distribution does not vary very much, the correction parameter k is decremented (S6). However, the correction parameter k is restricted not to lower than 0 (S4).

If the correction parameter k is found to be 0 at S8, original three primary colors are selected as an output of a selector 36 (S9). When the correction parameter k ranges from 1 to 8, a correction level designation signal is assigned a value associated with the correction parameter k and fed to a synthesizing circuit 34 (S10). At the same time, false three primary colors are selected as an output of the selector 36 (S11). However, an initial value of the correction parameter k is cleared to 0 by a main program.

Next, it is checked if the correction parameter k is 0 at S12. If the correction parameter k is 0, a hue luminance distribution stability kk indicating a stability of a luminance distribution is incremented (S15). However, the hue luminance distribution stability kk is restricted not to exceed 8 (S14). Unless the correction parameter k is 0, the hue luminance distribution stability kk is reset to 0 (S13).

Then, it is checked at S16 if the hue luminance distribution stability kk is equal to 8. If the hue luminance distribution stability kk is 8, it is determined that hues are stabilized. Then, an average color update signal is validated to update an average color (S18). Unless the hue luminance distribution stability kk equals to 8, the average color update signal is invalidated (S17) so that an average color will not be updated but held intact. Then, the program terminates at S19.

If a freeze signal enters an input port 50, the CPU 53 selects an original color image as an output of the selector 36 unconditionally using a select signal sent via an output port 51. Thus, the program operates. Thereby, when an operator wants a still image, an original color image can be displayed promptly.

According to this embodiment, when color misregistration due to water supply occurs, it is checked if a luminance distribution all over a screen varies greatly. Then, when the luminance distribution all over a screen varies greatly, it is determined that color misregistration due to water supply has occurred. Then, a false color image free from color misregistration is displayed. Therefore, while carrying on water supply, an operator can observe an image without color misregistration but not a hard-to-see image or a rainbow-colored image.

Adoption of a correction parameter k eliminates frequent switching between an original image and a false image, thus avoiding hard-to-see display.

Thanks to an average color update signal, an average color of an image having intense color misregistration due to water supply will not be adopted as a correction color. Therefore, an operator will not experience an unnatural feeling. A correction color is always proper and stable.

Real-time color difference signals and average color difference signals are synthesized at synthetic ratios determined with a correction parameter k. Therefore, a normal mode and a correction mode are switched smoothly. This helps ease stress to an operator's eyes.

In this embodiment, various constants employed in FIG. 22 can be set to more optimal values by analyzing clinical image data.

In this embodiment, the correction parameter k ranges from 0 to 8. The relationship between the correction parameter k and the correction level may vary as shown in FIG. 23. This will further smoothen switching between a normal mode and a correction mode.

In FIG. 23a, the correction parameter k provides a wide range of values for a maximum correction level. Once water supply is identified, control cannot be escaped from a correction mode.

FIG. 23b shows a multi-trace method. Unlike a single-trace method in which when a correction parameter k is determined, a correction level is specified automatically, the next correction level is determined with a current correction level, a current correction parameter k, and a next correction parameter k. This method will further smoothen return to the normal mode after a long period of water supply.

In this embodiment, a change in a luminance distribution is checked to detect water supply. Water supply may be detected by checking a change in a distribution of R, G, or B colors, a distribution of R-Y or B-Y color differences, or a distribution in other color space coordinate system.

When a variance of a luminance distribution exceeds a certain value, it may be determined that water supply is under way.

Alternatively, a color misregistration detecting means 38 may have a configuration shown in FIG. 24. A comparator 56 is used to detect whether a luminance crosses a certain set value. The frequency that the comparator 56 crosses the value may be counted using a counter 57.

In this case, as shown in FIG. 25, halations seen even in a normal image and water drops occurring during water supply are counted. Therefore, an absolute value of a crossing frequency may be compared with a certain value. Water supply may be identified when a variation of a crossing frequency from field to field exceeds a certain value. This helps avoid direct influence of halation.

Figure 26:
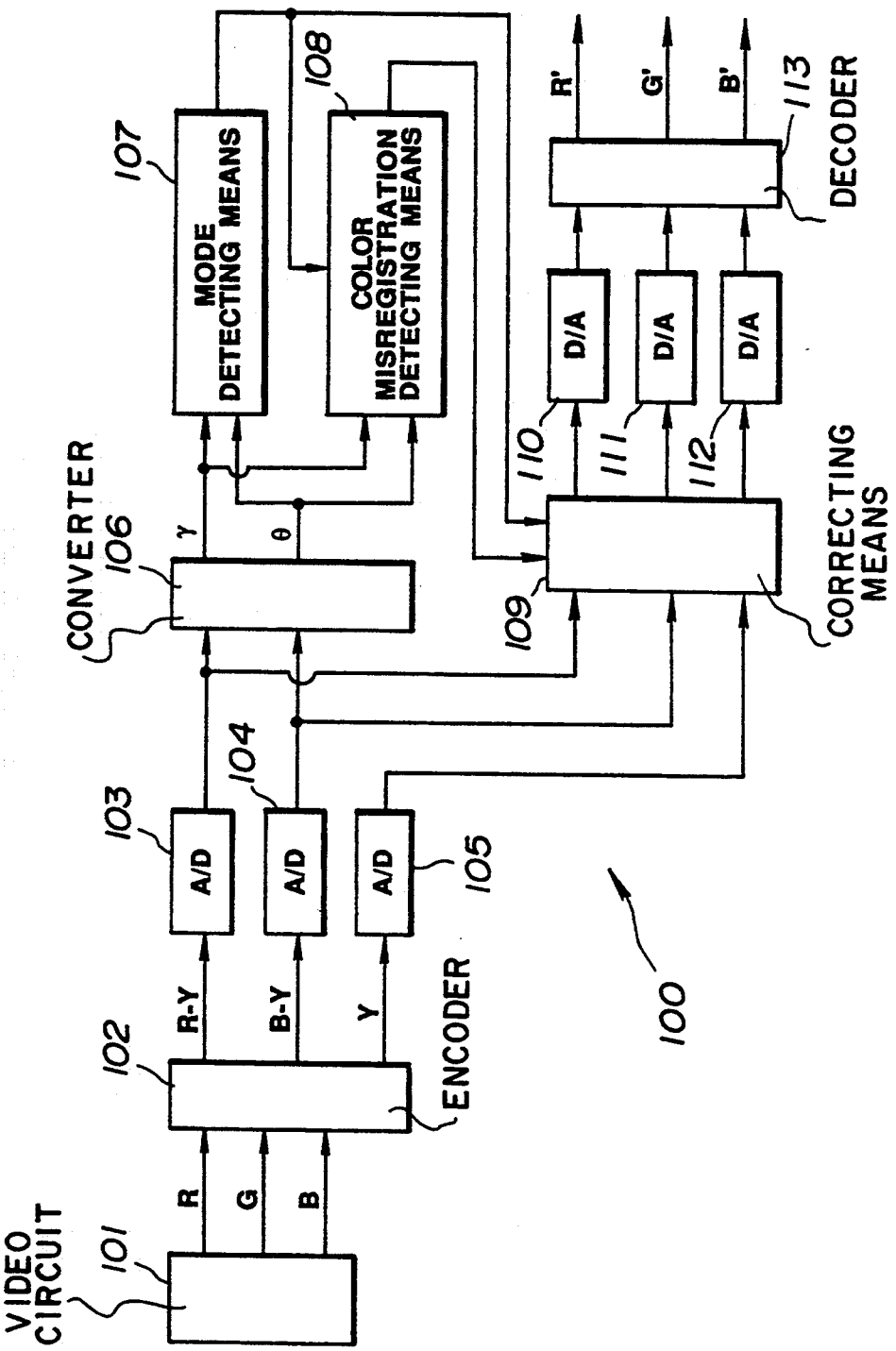
FIG. 26 is an overall block diagram of the eighth embodiment.
Figure 27:
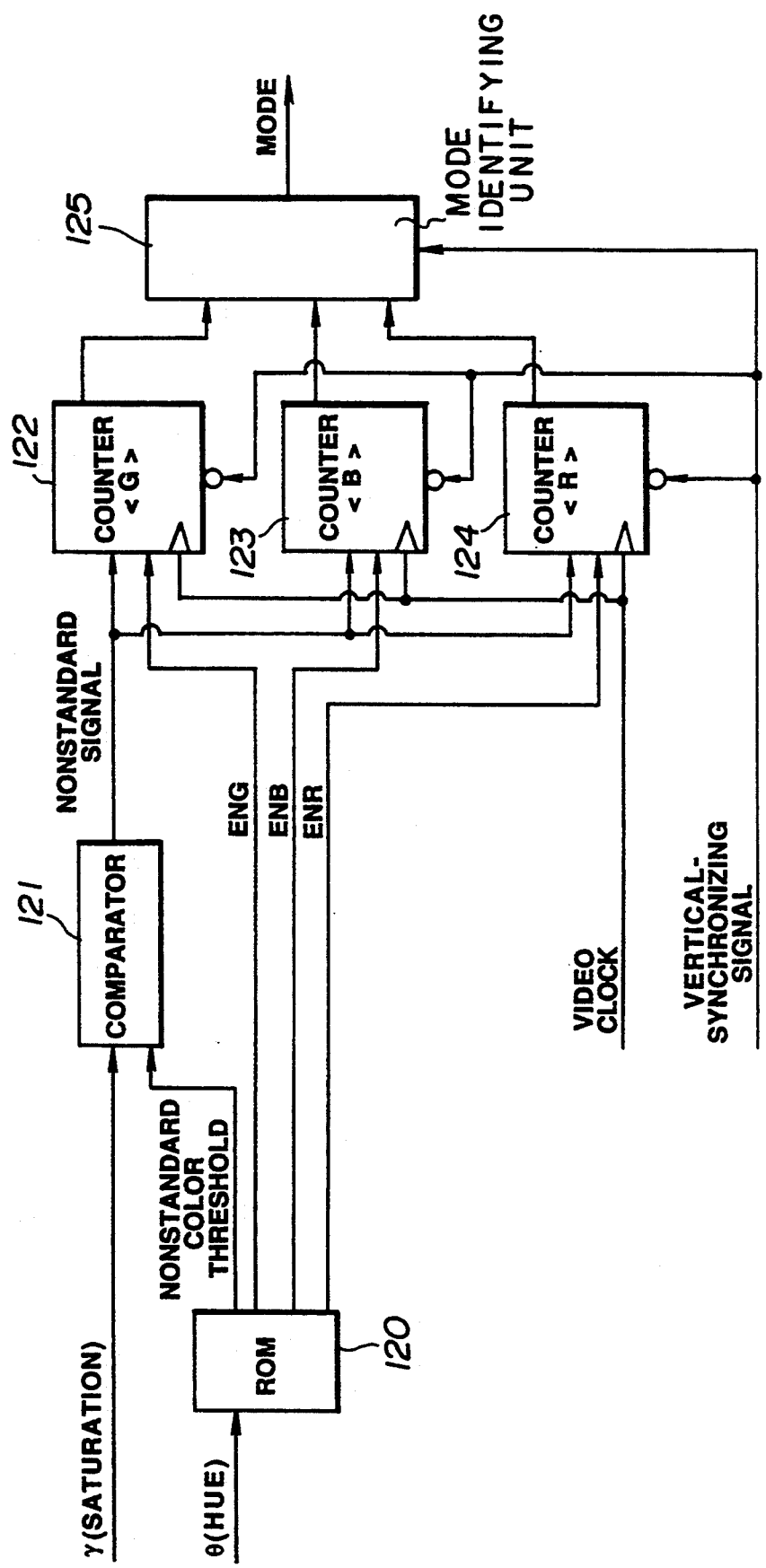
FIG. 27 is a block diagram of a mode detecting means.
Figure 28:
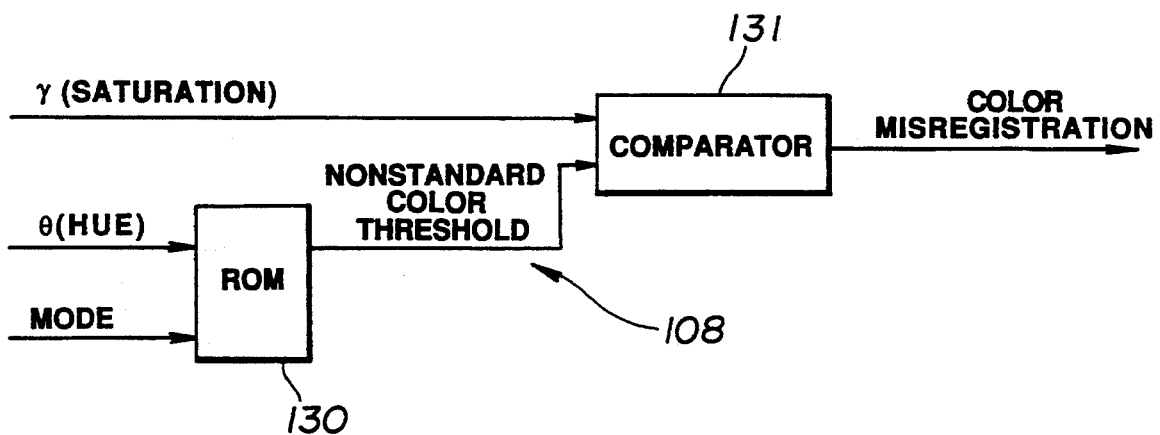
FIG. 28 is a block diagram of a color misregistration detecting means.
Figure 29:
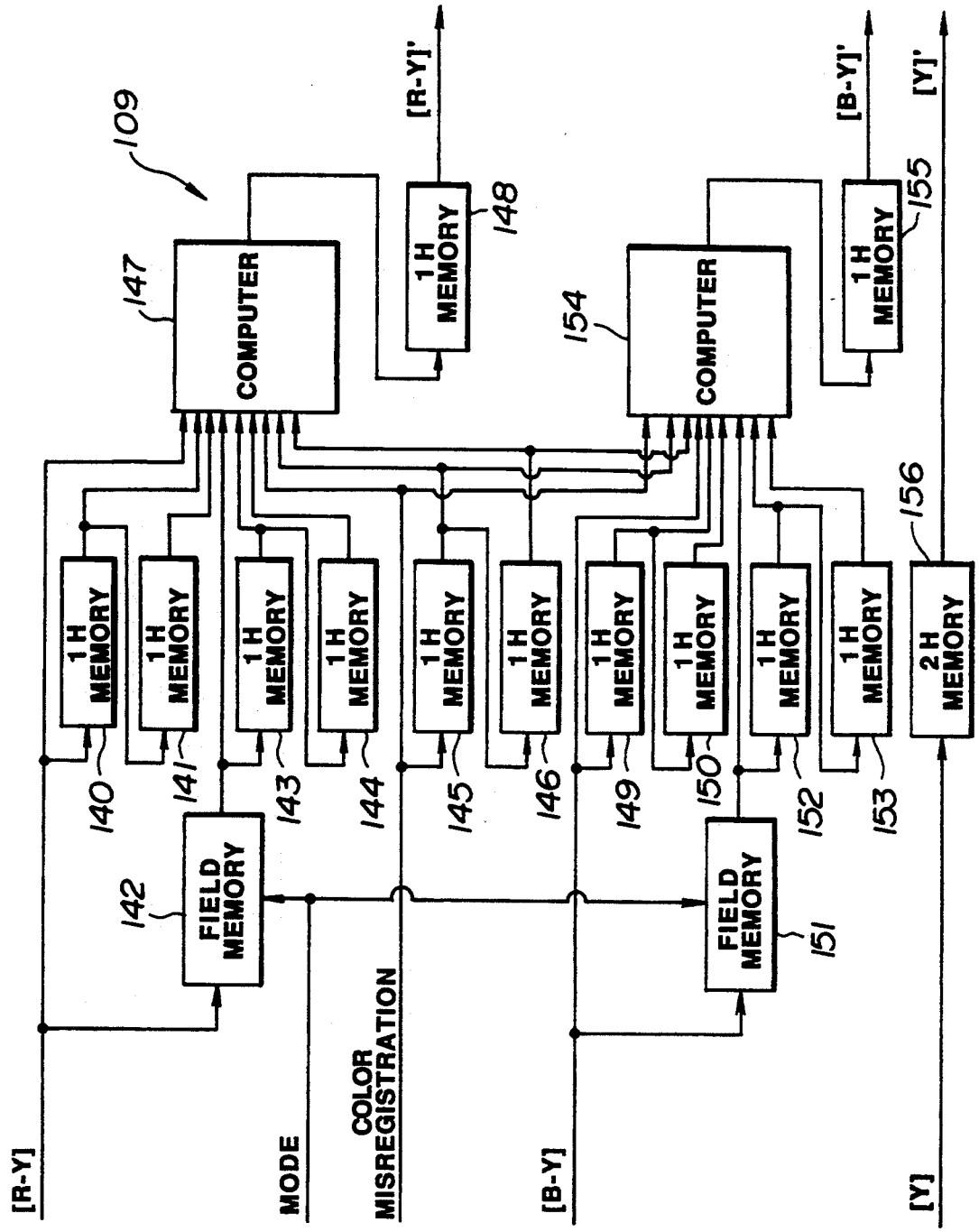
FIG. 29 is a block diagram of a correcting means.
Figure 30A:
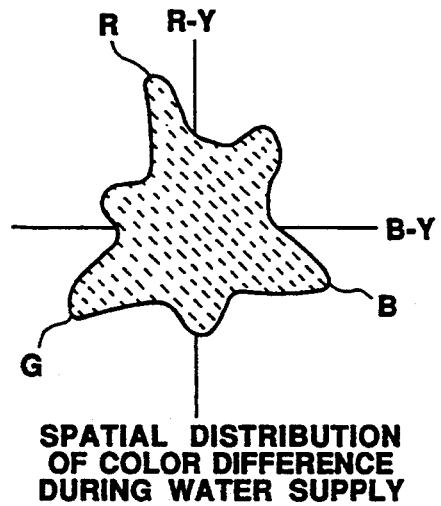
FIGS. 30a, 30b, and 30c show spatial distributions of color differences during water supply, normal operation, and dying.
Figure 30B:
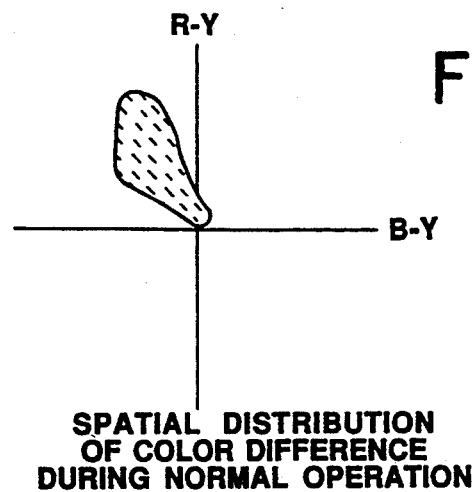
Figure 30C:
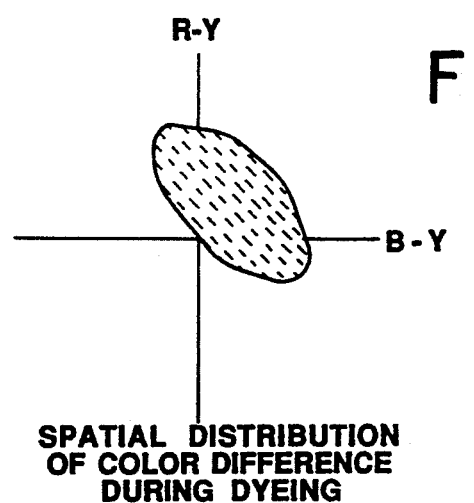
Figure 31A:
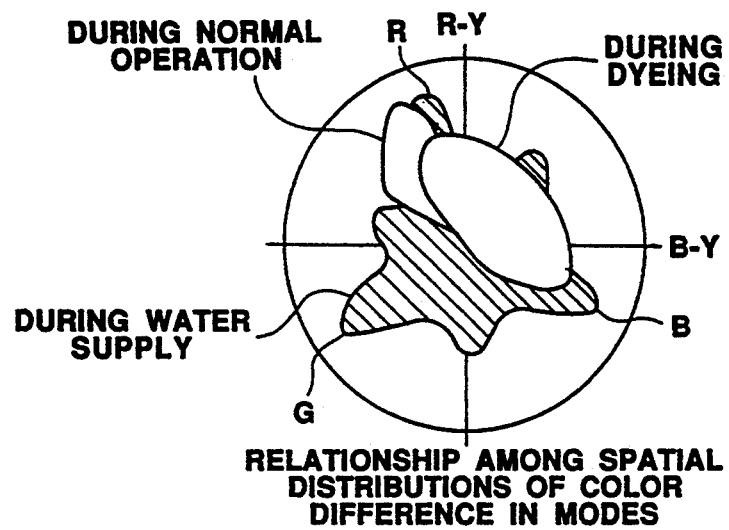
FIGS. 31a, 31b, and 31c are explanatory diagrams relating spatial distributions of color differences to set modes.
Figure 31B:
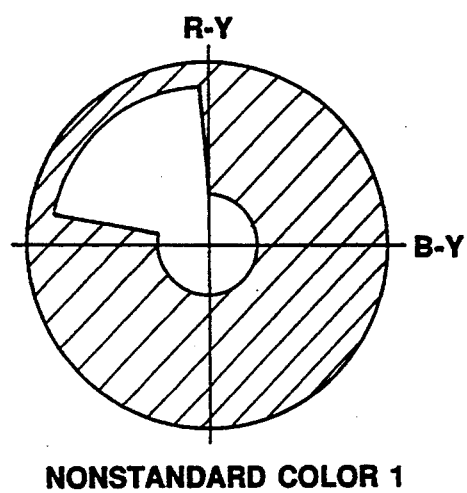
Figure 31C:
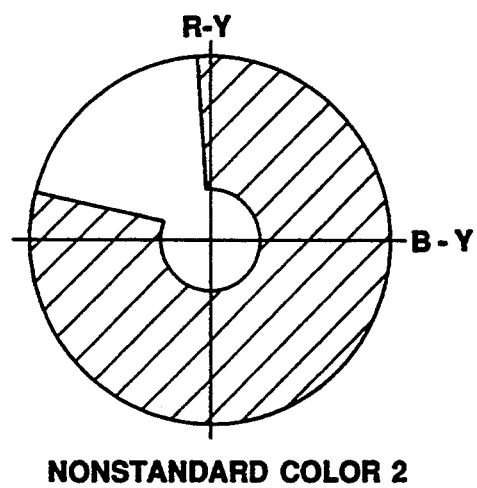
Figure 32A:
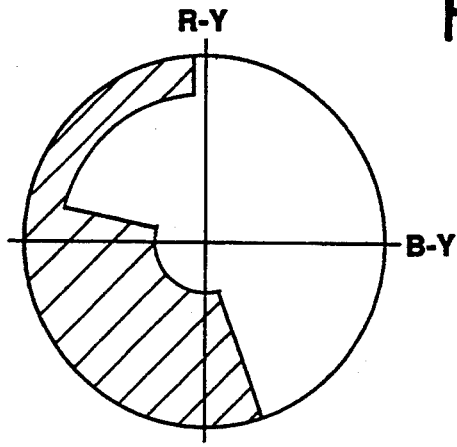
FIGS. 32a, 32b, and 32c are explanatory diagrams concerning set modes in the color difference space.
Figure 32B:
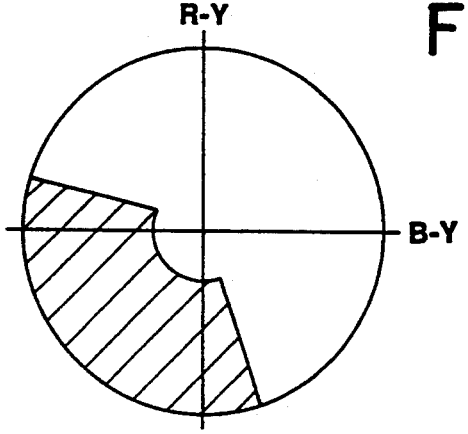
Figure 32C:
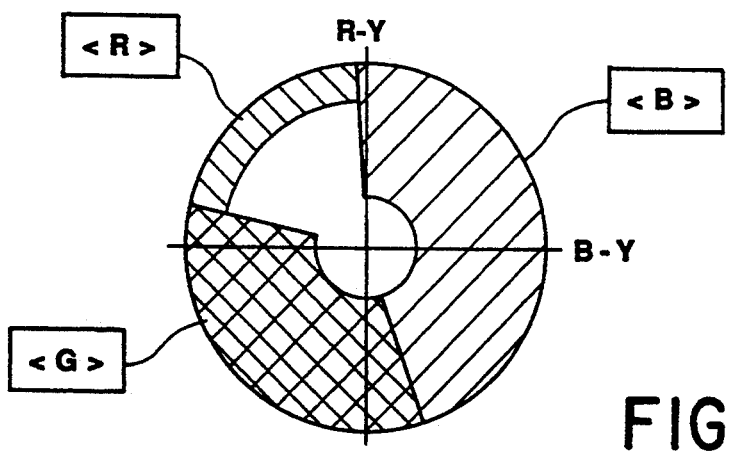

FIGS. 26 to 34 relate to the eighth embodiment of the present invention. FIG. 26 is an overall configuration of this embodiment. FIG. 27 is a block diagram of a mode detecting means. FIG. 28 is a block diagram of a color misregistration detecting means. FIG. 29 is a block diagram of a correcting means. FIG. 30 are spatial distributions of color differences during water supply, normal operation, and dying. FIG. 31 are explanatory diagrams each relating a distribution in a color difference space to a set mode. FIG. 32 are explanatory diagrams concerning set modes in a color difference space. FIG. 33 is a table listing criteria for detecting color misregistration pixels during mode detection. FIG. 34 are explanatory diagrams for explaining the contents of an arithmetic logic unit of a correcting means.

A color misregistration easing system of this embodiment eases color misregistration in an image produced using an endoscope which is not shown according to a field sequential technique.

A video circuit 101 of a color misregistration easing system 100 shown in FIG. 26 inputs a signal the endoscope acquires, processes the signal to convert it into three primary color signals R, G, and B, then outputs the three primary color signals R, G, and B.

The three primary color signals R, G, and B the video circuit 101 outputs enter an encoder 102. Then, a luminance signal Y and color difference signals R-Y and B-Y are generated. The luminance signal Y and color difference signals R-Y and B-Y are digitized by A/D converters 103, 104, and 105, then fed to a correcting means 109. The luminance and color difference signals whose color misregistration are corrected by the correcting means 109 are converted into analog signals by D/A converters 110, 111, and 112, then fed to a decoder 113. The decoder 113 converts the analog signals to produce corrected three primary color signals R', G', and B'. Finally, the R', G', and B' signals appear on a display which is not shown.

The color difference signals digitized by the A/D converters 103 and 104 are fed to a converter 106, then converted into a hue $\theta$ and a saturation $\gamma$. These two signals enter a mode detecting means 107 and a color misregistration detecting means 108. A mode signal the mode detecting means 107 outputs enters the color misregistration detecting means 108 and a correcting means 109. Then, a color misregistration signal the color misregistration detecting means 8 outputs enters the correcting means 109. The correcting means 109 carries out color misregistration correction according to the mode signal and color misregistration signal.

FIG. 27 is a block diagram of a mode detecting means 7.

A hue $\theta$ a converter 106 provides enters a ROM 120. From the ROM 102, a predetermined nonstandard color threshold (saturation) associated with the hue $\theta$ is fed to a comparator 121. The comparator 121 also inputs a saturation $\gamma$ the converter 106 provides and compares it with the nonstandard color threshold (saturation). A nonstandard signal the comparator 121 outputs enters a counter $<G>$ 122, a counter $<B>$ 123, and a counter $<R'>$ 124.

Three signals ENG, ENB, and ENR go to the counter $<G>$ 122, counter $<B>$ 123, and counter $<R'>$ 124, thus designating a counter to be validated that is associated with a hue in the ROM 120. A video clock and a vertical-synchronizing signal sent from a video circuit in an endoscope which is not shown enter the counter <G> 122, counter <B> 123, and counter <R'> 124.

The counter <G> 122 counts up with a video clock, when the ENG is a 1 and the nonstandard signal is a 1. With a vertical-synchronizing signal, the counter is cleared to 0 s. The counter <B> 123, and counter <R'> 124 operates similarly to the counter <G> 122.

The outputs of the counter <G> 122, counter <B> 123, and counter <R'> 124 are fed to a mode identifying unit 125. The mode identifying unit 125 inputs the vertical-synchronizing signal, checks their counts immediately before entry of the vertical-synchronizing signal to identify a mode, then outputs a mode signal.

FIG. 28 is a block diagram of a color misregistration detecting means 108.

A hue θ a converter 106 provides and a mode signal a mode identifying unit 125 provides enter a ROM 130. From the ROM 130, a predetermined nonstandard color threshold (saturation) is supplied according to the values of the hue and the mode signal. The nonstandard color threshold is fed to a comparator 131. The comparator 131 inputs a saturation γ the converter 106 provides and compares it with the nonstandard color threshold (saturation). The comparator 131 outputs a color misregistration signal for each pixel.

FIG. 29 is a block diagram of a correcting means 109.

A color difference signal [R-Y] an A/D converter 103 has digitized enters an arithmetic logic unit 147, a 1H memory 140, and a field memory 142. A color difference signal [B-Y] an A/D converter 104 has digitized enters an arithmetic logic unit 154, a 1H memory 149, and a field memory 151.

A mode signal is placed in the field memories 142 and 151. When water supply is identified, the contents of the memories are not updated. An output of the field memory 142 is fed to the arithmetic logic unit 147 and 1H memory 143. An output of the field memory 151 is fed to the arithmetic unit 154 and 1H memory 152.

A color misregistration signal a color misregistration detecting means 108 provides goes to the arithmetic logic units 147, 154, and 145.

Signals entering the 1H memories 140, 143, 145, 149, and 152 are delayed by one line each, then put in the 1H memories 141, 144, 146, 150, and 153. Thus, signals delayed by two lines each are produced.

The arithmetic logic unit 147 inputs a total of nine signals; the color difference signal [R-Y] and its one-line delayed and two-line delayed signals, an output signal of the field memory 142 and its one-line delayed and two-line delayed signals, and the color misregistration signal and its one-line delayed and two-line delayed signals. An output of the arithmetic logic unit 147 is delayed by one line in a 1H memory 148, then fed as a color difference signal [R-Y]' to a D/A converter 110.

Similarly, the arithmetic logic unit 154 inputs a total of nine signals; the color difference signal [B-Y] and its one-line delayed and two-line delayed signals, an output signal of the field memory 151 and its one-line delayed and two-line delayed signals, and the color misregistration signal and its one-line delayed and two-line delayed signals. An output of the arithmetic logic unit 154 is delayed by one line in the 1H memory 55, then fed as a color difference signal [B-Y]' to a D/A converter 111.

On the other hand, a luminance signal [Y] is delayed by two lines in a 2H memory 56, then fed as a luminance signal [Y]' to a D/A converter 112.

The operations of the embodiment having the aforesaid configuration will be described.

First, spatial distributions of color differences will be described in association with endoscopic examination modes using FIGS. 30 to 32. During endoscopic examination, a patient's body cavity is imaged. Therefore, color differences indicating a color near a flesh color are distributed as shown in FIG. 30b. Methylene blue or other pigment is sometimes dispersed to detect an abnormal region during endoscopic examination. At this time, color differences are distributed as shown in FIG. 30c. When water supply for cleaning a lens is under way, pixels tinting three primary colors and their mixed colors increase in number as shown in FIG. 30a. The color difference distribution of the pixels expands very widely. When the spatial distributions of color difference spaces in three modes are overlapped, the distributions obviously differ one another as shown in FIG. 31d.

Using FIG. 33, how a mode detecting means 7 identifies a mode will be described.

With appearance of a pixel categorized into, for example, an <R"> segment in a color difference space for nonstandard colors shown in FIG. 32i, a counter <R"> 124 counts up. Similarly, when a pixel categorized into a <B> or <G> segment appears, a counter <B> 123 or a counter <G> 122 counts up. Then, before the counters are cleared with a vertical-synchronizing signal, a mode identifying unit 125 reads the values of three counters, and checks if the counter values exceed certain values to identify a mode. FIG. 33 lists the conditions for identification.

Whether or not a water supply mode is designated is determined, as apparent from FIG. 31d, by checking if the number of pixels in a <G> segment exceeds a certain value. A dying mode in which water supply is not under way is identified by checking if the number of pixels in a <B> segment exceeds a certain value. Whether a bright red or a blood color is present in other mode except a water supply mode is determined by checking if the number of pixels in an <R"> segment exceeds a certain value.

Depending on the result of the mode identification, criteria for detecting color misregistration a color misregistration detecting means 108 uses varies.

To be more specific, as shown in FIG. 33, when a blood color is not recognized in normal mode, a hatched segment in FIG. 31e (nonstandard color 1) is adopted to define nonstandard colors. When a blood color is recognized in normal mode, a hatched segment in FIG. 31f (nonstandard color 2) is adopted to define nonstandard colors. When a blood color is not recognized in dying mode, a hatched segment in FIG. 32g (nonstandard color 3) is adopted as a nonstandard color segment. When a blood color is recognized in drying mode, a hatched segment in FIG. 32h (nonstandard color 4) is adopted as a nonstandard color segment.

In water supply mode, nonstandard colors in a mode immediately before the water supply mode are used to detect color misregistration. Therefore, a mode signal the mode identifying unit 125 outputs selects one of four modes except the water supply mode. In short, when the water supply mode is specified, a mode signal specifying the immediately preceding mode is maintained.

In response to a mode signal, a ROM 130 in a color misregistration detecting means 108 outputs a saturation threshold of a nonstandard color associated with each mode. Then, a comparator 31 compares an actual saturation of each pixel with the saturation threshold of a nonstandard color. If the actual saturation of a pixel is larger, the pixel is recognized as a color misregistration pixel. That is to say, pixels showing low saturations are not subjected to color misregistration correction. Conspicuous pixels showing high saturations alone are subjected to color misregistration correction.

A color misregistration signal the color misregistration detecting means 108 thus outputs enters a correcting means 109.

Color misregistration correction will be described in conjunction with FIG. 34.

Figure 34B:
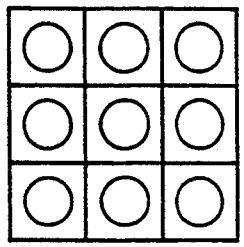
FIGS. 34a, 34b, 34c, 34d, and 34e are explanatory diagrams for explaining the contents of an arithmetic logic unit in a correcting means.
Figure 34E:
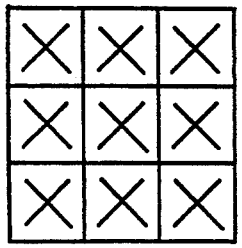
Figure 34A:
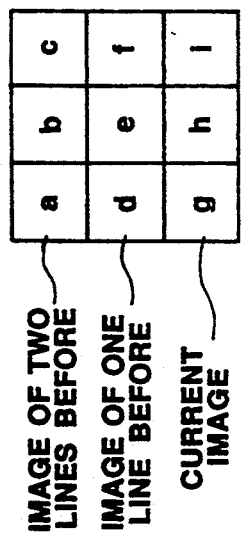
Figure 34D:
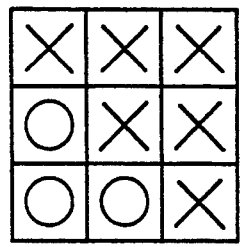
Figure 34C:
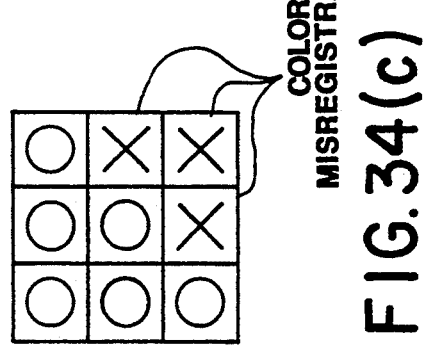

An arithmetic logic unit 147 has a three-step shift register for handling nine input signals. FIG. 34a shows the shift resister and arrangements of pixels stored. In FIG. 34, a, b, and c denote three pixels of two lines before. d, e, and f denote three pixels of one line before. g, h, and i denote three pixels of a current line. A pixel of interest is e in the center. FIGS. 34b to 34e show the states of the shift register in association with color misregistration signals. o indicates a non color misregistration pixel. x indicates a color misregistration pixel. Assuming that an output of the arithmetic logic unit 147 is F, F is defined as follows:

for the state b, F equals to an actuate e;

for the state c, F equals to {(actual a+b+c+d+e+g)+(f+h+i in field memories)}/9;

for the state d, F equals to {(actual a+b+d)+(c+e+f+g+h+i in field memories)}/9; and for the state e, F equals to (a+b+c+d+e+f+g+h+i in field memories)/9.

When no pixel has color misregistration:

F=an actual e.

When even a single pixel has color misregistration:

F={(total of actual color differences of non-color misregistration pixels)+(total of color differences of color misregistration pixels in field memories)}/9

The output F of the arithmetic logic unit 147 is delayed by one line in a 1H memory 148 so that the resultant image will be synchronized with a raw image laterally. Thus, the output F is supplied as a color difference signal [R-Y]' lagging by two lines behind and actual pixel.

Similarly, an output of an arithmetic logic unit 154 is delayed by one line in a 1H memory 155, then supplied as a color difference signal [B-Y]' lagging by two lines behind an actual pixel.

On the other hand, a luminance Y is delayed by two lines in a 2H memory 156, then supplied as a luminance signal [Y]'. In synchronization with the color difference signals [R-Y]' and [B-Y]', the luminance signal [Y]' is fed to a D/A converter.

According to this embodiment, correction involves only color differences of a nonstandard color; that is, a hue that cannot appear in a normal image or a bright color with a high saturation. This avoids correction of inconspicuous color misregistration which may in turn provide a hard-to-see image. Color misregistration correction can be applied adequately. Therefore, a doctor will not suffer fatigued eyes during endoscopic examination. According to this embodiment, a nonstandard color range in a color difference space varies depending on an image state (mode) specified before color misregistration due to water supply occurs. Even during dying or bleeding, pixels most eligible to color misregistration correction can be detected.

This embodiment is compared with a detecting means that compares current color differences with those of several fields before, and identifies a color misregistration pixel in which the quantities of changes in color differences exceed certain values. Even when color differences of a color misregistration pixel return to those of a normal image, the detecting means mistakes it for a color misregistration pixel. This embodiment can avoid this mistake and prevent pixels that need not be corrected from being corrected and in turn producing a hard-to-see image.

In this embodiment, color differences are used to define nonstandard colors. Other color coordinate system may be employed to define nonstandard colors.

In the present invention, it will be apparent that a wide range of different embodiments can be formed according to the spirit of the invention. This invention will be restricted to the appended claims but not limited to any specific embodiments.

What is claimed is:

1. A color misregistration detector for detecting misregistration in a color image signal of a subject imaged using a field sequential type imaging means, comprising:
    a color information detecting means for detecting at least a value of color information contained in said color image signal;
    a color information comparing means for comparing color information detected by said color information detecting means with given color information;
    a distribution calculating means for calculating distribution with regard to a result of comparing obtained by said color information comparing means; and
    a determining means for determining a cause of color misregistration based on the distribution calculated by said distribution calculating means.

2. A color misregistration detector according to claim 1, wherein said given color information specified in said color information comparing means is past color information.

3. A color misregistration detector according to claim 1, wherein said given color information specified in said color information comparing means is color information that does not vary for a given period of time.

4. A color misregistration detector according to claim 1, wherein said given color information specified in said color information comparing means is reference color information.

5. A color misregistration detector according to claim 1, wherein said color information specified in said color information comparing means is color information at a given relative position in a screen.

6. A color misregistration detector according to claim 1, wherein said cause of color misregistration determined by said determining means includes a cause resulting in a difference between time-sequential variations in color misregistration.

7. A color misregistration detector according to claim 1, wherein said cause of color misregistration determined by said determining means includes a cause resulting in a difference between spatial variations in color misregistration.

8. A color misregistration detector according to claim 1, wherein said cause of color misregistration determined by said determining means includes a cause resulting in a difference between variations in at least a value of color information.

9. A color misregistration detector according to claim 1, wherein said cause of color misregistration determined by said determining means includes a cause resulting in conspicuous or inconspicuous color misregistration.

10. A color misregistration detector according to claim 1, wherein said color information detecting means is a color difference information detecting means for detecting color differences of said image in said color image signal.

11. A color misregistration detector according to claim 1, wherein said color information detecting means is a hue information detecting means for detecting a hue of said image in said color image signal.

12. A color misregistration detector according to claim 1, wherein said color information detecting means is a saturation information detecting means for detecting a saturation of said image in said color image signal.

13. A color misregistration detector according to claim 1, wherein said color information detecting means is a luminance information detecting means for detecting a luminance of said image in said color image signal.

14. A color misregistration detector according to claim 1, wherein said color information detecting means is a three-primary color detecting means for detecting three primary colors of said image in said color image signal.

15. A color misregistration detector according to claim 1, wherein said color information detecting means is an HSI detecting means for detecting H, S, and I data of said image in said color image signal.

16. A color misregistration detector according to claim 2, wherein said color information comparing means includes a color information change detecting means for comparing current color information detected by said color information detecting means with past color information on a pixel or give block basis and calculating a quantity of the change, and a change value distribution calculating means for calculating a distribution of quantities of changes calculated by said color information change detecting means on a pixel or give block basis as the numbers of pixels or given blocks for each screen; and
said determining means determines a cause of color misregistration according to a distribution of quantities of changes calculated by said change value distribution calculating means.

17. A color misregistration detector according to claim 2, wherein said color information comparing means includes a color information distribution calculating means which calculates a distribution of color information detected by said color information detecting means, and a color information distribution change calculating means which calculates a change in said color information distribution by time-serially comparing the color information distributions calculated by said color information distribution calculating means; and
said determining means determines a cause of color misregistration on the basis of a time-series change in the color information distribution calculated by said color information distribution change calculating means.

18. A color misregistration detector according to claim 4, wherein said color information detecting means detects at least a value of color information contained in a color image signal on a pixel or block basis;
said color information comparing means compares color information which said color information detecting means detects on a pixel or given block basis with a set value; and
said determining means includes a color misregistration identifying means which determines for each screen whether or not color misregistration occurs according to the result of comparison provided by said color information comparing means.

19. a color misregistration detector according to claim 4, wherein said reference color information specified in said color information comparing means is a distribution of hues in a past screen having little changes in hues;
said color information comparing means calculates a ratio of a past hue distribution to a current hue distribution; and
said determining means determines a cause of color misregistration according to said ratio between current and past hue distributions calculated by said color information comparing means.

20. A color misregistration detector according to claim 4, wherein said reference color information specified in said color information comparing means is a standard color information range that is a range of color information which the subject to be imaged can provide.

21. A color misregistration detector according to claim 5, wherein said color information comparing means includes a color information change value calculating means which calculates quantities of changes in color information of adjacent pixels on the basis of the color information detected by said color information detecting means.

22. A color misregistration detector according to claim 16, wherein said determining means determines a cause of color misregistration according to a distribution of quantities of changes calculated by said change value distribution calculating means or depending on whether or not the number of pixels or given blocks each having a given quantity of a change exceeds a set value.

23. A color misregistration detector according to claim 16, wherein said determining means time-sequentially monitors whether or not the number of pixels or given blocks exceeds a set value specified for a given quantity of a change by checking a distribution of quantities of changes calculated by said change value distribution calculating means, and determines a cause of color misregistration depending on whether or not the result of the monitor exceeds a given time.

24. A color misregistration detector according to claim 16, wherein said change value distribution calculating means includes a plurality of counting means associated with a plurality of segments into which said quantities of changes are classified, and these counting means count the numbers of pixels or given blocks belonging to the segments.

25. A color misregistration detector according to claim 17, wherein said color information distribution change calculating means includes a plurality of counting means for counting the numbers of pixels having color information of the amounts detected by said color information detecting means which are classified into a plurality of segments, and a storing means for storing the members of pixels belonging to the segments counted by said plurality of counting means.

26. A color misregistration detector according to claim 17, wherein said color information detecting means is a luminance information detecting means for detecting a luminance of said screen on a pixel or block basis.

27. A color misregistration detector according to claim 17, wherein said color information distribution change calculating means includes a counting means for counting a frequency that color information detected by said color information detecting means crosses a given value, and a storing means for storing the count provided by said counting means; and said determining means is a color misregistration identifying means for identifying presence of color misregistration depending on whether or not a time-series variation in the count stored in said storing means exceeds a set value.

28. A color misregistration detector according to claim 18, wherein said color information detecting means is a saturation information detecting means for detecting a saturation of said screen on a pixel or block basis.

29. A color misregistration detector according to claim 19, wherein said color information comparing means calculates a ratio of a past hue variance calculated for each screen to a current hue variance calculated for each screen; and said determining means determines a cause of color misregistration according to said ratio between current and past hue variances calculated by said color information comparing means.

30. A color misregistration detector according to claim 20, wherein said determining means identifies a color misregistration pixel or a color misregistration block when a value of color information contained in a pixel or a given block forming a screen is present outside said standard color information range.

31. A color misregistration detector according to claim 20, wherein said subject to be imaged is an endoscopic image of a living body, and said standard color information range is specified in terms of statistical characteristics of said color information of a living body.

32. A color misregistration detector according to claim 20, wherein said color information detecting means is a chromaticity detecting means for detecting a chromaticity in said color image signal; and said determining means identifies a color misregistration pixel or a color misregistration block when the chromaticity of said subject is present outside a standard chromaticity range that is a range of chromaticities which a subject to be imaged can provide.

33. A color misregistration detector according to claim 30, further comprising a mode detecting means which detects a mode varying with a type or state of a subject on a field or a frame basis using a color image signal which is outputted by said imaging means.

34. A color misregistration detector according to claim 21, wherein said color information change value calculating means calculates a quantity of a change in color information by differentiating or differencing amounts of color information detected by said color information detecting means.

35. A color misregistration detector according to claim 21, further comprising a comparing and determining means for comparing a quantity of a change in color information calculated by said color information change value calculating means with a set value and determining whether or not the quantity of a change exceeds the set value;

said determining means determining a cause of color misregistration according to the result of comparison provided by said comparing and determining means.

36. A color misregistration detector according to claim 22, wherein said determining means monitors whether or not the numbers of pixels having of a plurality of quantities of changes exceeds set values by checking a distribution of quantities of changes calculated by said change value distribution calculating means, and determines a cause of color misregistration according to the results of the monitor.

37. A color misregistration detector according to claim 32, wherein said range of standard chromaticities specified in said color misregistration detecting means includes given saturations differing in association with hues.

38. A color misregistration detector according to claim 32, further comprising a mode detecting means which detects a mode varying with a type or state of a subject on a field or frame basis using a color image signal said imaging means outputs;

said color information comparing means changing said range of standard chromaticities into a different range according to the mode of one field or frame before detected by said mode detecting means, and identifying a color misregistration pixel or a color misregistration block when the chromaticity of a pixel or a give block is present outside said range of standard chromaticities.

39. A color misregistration detector according to claim 32, wherein said color information detecting means is a calculating means which calculates a saturation and a hue of said subject screen on a pixel or given block basis using a color image signal fed by said imaging means;

said mode detecting means includes a color information comparing means which compares a given saturation specified on the basis of a hue calculated by said calculating means with a saturation calculated by said calculating means on a pixel or given block basis, counts the number of pixels or given blocks for each of a plurality of prescribed hue ranges when a result provided by said color information comparing means indicates a saturation exceeding said given saturation, uses the counts to calculate a chromaticity distribution on a field or frame basis, then detects said mode according to the calculated chromaticity distribution;

said color information comparing means modifies a saturation threshold associated with a hue which said calculating means calculates on the basis of a mode detected by said mode detecting means; and said determining means identifies a color misregistration pixel or a color misregistration block when a saturation exceeds the saturation threshold.

40. A color misregistration detector according to claim 33, wherein said mode detecting means detects a mode by checking part or a whole of a screen for one field or frame.

41. A color misregistration detector according to claim 33, wherein said mode which said mode detecting means identifies on the basis of a type or state of a subject includes a mode in which only a living body is imaged as said subject, a mode in which water supplied from said imaging means is also imaged as said subject, a mode in which a dyed living body is imaged as said subject, and a mode in which bleeding of a living body is also imaged as said subject.

42. A color misregistration easing system having a color misregistration detector claimed in claim 1 or 17 and easing color misregistration in a color image signal of a subject imaged using a field sequential type imaging means, including a correcting means which corrects said color image signal according to the result of determination provided by said determining means.

43. A color misregistration easing system having a color misregistration detector claimed in claim 17 and easing color misregistration in a color image signal of a subject imaged using a field sequential type imaging means, including:
    an average color information generating means which calculates an average of color information within said screen using said color image signal;
    a means for generating a correction image signal of said subject on the basis of the average generated by said average color information generating means; and
    a synthesizing means for synthesizing said color image signal and a correction image signal generated by said generating means, outputting the synthetic signal, and varying a synthetic ratio according to the result of determination provided by said determining means.

44. A color misregistration easing system according to claim 43, wherein said average color information generating means updates an average generated by said average color information generating means, only when said determining means determines that a time-series change in the color information distribution is small.

45. A color misregistration easing system having a color misregistration detector claimed in claim 17 and easing color misregistration in a color image signal of a subject imaged using a field sequential type imaging means on a pixel or given block basis, including:
    a correcting means for correcting said color image signal associated with a pixel or a given block in which said determining means determines that color misregistration is present, and outputting the corrected color image signal as a correction image signal.

46. A color misregistration easing system according to claim 45, wherein said correcting means replaces said color misregistration pixel with a past pixel free from color misregistration, when at least one color misregistration pixel in which said determining means determines that color misregistration is present is found among a center pixel of interest to be corrected and pixels surrounding the center pixel, calculates an average of color information associated with the center pixel and its surrounding pixels including the replaced pixel, then outputs the average as a correction image signal for the center pixel.

47. A color misregistration easing system according to claim 46, wherein said correcting means does not correct a center pixel of interest but uses the color information of the pixel of interest as a correction image signal, only when said color misregistration detecting means determines that color misregistration is absent from all pixels including said center pixel of interest to be corrected and pixels surrounding the center pixel.

48. A color misregistration easing system according to claim 46, wherein said correcting means calculates average color difference signals as said average of color information, and generates a correction image signal using said average color difference signals and an uncorrected luminance signal.

* * * * *